United States Patent
Hirano et al.

(10) Patent No.: US 8,681,447 B2
(45) Date of Patent: *Mar. 25, 2014

(54) RECORDING APPARATUS, SERVER APPARATUS, RECORDING METHOD, PROGRAM AND STORAGE MEDIUM

(71) Applicant: Sony Corporation, Tokyo (JP)

(72) Inventors: Koji Hirano, Kanagawa (JP); Shoji Inagaki, Tokyo (JP); Ryuichiro Togashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/652,852

(22) Filed: Oct. 16, 2012

(65) Prior Publication Data

US 2013/0100785 A1     Apr. 25, 2013

Related U.S. Application Data

(63) Continuation of application No. 13/007,377, filed on Jan. 14, 2011, now Pat. No. 8,315,004, which is a continuation of application No. 12/385,862, filed on Apr. 22, 2009, now Pat. No. 7,903,362, which is a continuation of application No. 11/437,641, filed on May 22, 2006, now Pat. No. 7,561,363, which is a continuation of application No. 10/484,633, filed as application No. PCT/JP03/07411 on Jun. 11, 2003, now Pat. No. 7,145,741.

(30) Foreign Application Priority Data

Jun. 12, 2002   (JP) ................................. 2002-170901

(51) Int. Cl.
    *G11B 19/02*     (2006.01)
(52) U.S. Cl.
    USPC ........................................................ 360/69

(58) Field of Classification Search
    CPC ....................................................... G11B 19/02
    USPC .................................... 360/69, 55; 369/30.05
    See application file for complete search history.

(56) References Cited

U.S. PATENT DOCUMENTS

| 4,939,598 A | 7/1990 | Kulakowski et al. |
| 5,521,894 A | 5/1996 | Hiranuma |

(Continued)

FOREIGN PATENT DOCUMENTS

| EP | 1 094 460 A2 | 4/2001 |
| EP | 1 160 709 A2 | 12/2001 |

(Continued)

OTHER PUBLICATIONS

International Search Report, Sep. 16, 2003.

(Continued)

*Primary Examiner* — Fred Tzeng
(74) *Attorney, Agent, or Firm* — Oblon, Spivak, McClelland, Maier & Neustadt, L.L.P.

(57) ABSTRACT

An information processing apparatus including a reading unit, a processor, a transferring unit, and a control unit. The reading unit reads first management data from a first recording medium. The first management data identifies tracks of source data recorded on the first recording medium. The processor compares the first management data with second management data. The second management data identifies files of ripped data recorded on a second recording medium. The transferring unit transfers one of the tracks of the source data, to the second recording medium, when absent from the second recording medium. The control unit controls a display unit to display transferring status by a symbolic figure.

20 Claims, 15 Drawing Sheets

(56) References Cited

U.S. PATENT DOCUMENTS

| | | |
|---|---|---|
| 5,774,742 A | 6/1998 | Nakamura et al. |
| 6,112,255 A | 8/2000 | Dunn et al. |
| 7,069,400 B2 | 6/2006 | Takeda et al. |
| 7,099,557 B1 | 8/2006 | Morotomi et al. |
| 7,159,090 B2 | 1/2007 | Ohbi et al. |
| 7,228,568 B2 | 6/2007 | Abe et al. |
| 7,239,469 B2 | 7/2007 | Hirano et al. |
| 7,274,642 B2 | 9/2007 | Sako et al. |
| 7,401,064 B1 | 7/2008 | Arone et al. |
| 7,409,467 B2 | 8/2008 | Fujita et al. |
| 7,436,454 B2 | 10/2008 | Yamaguchi et al. |
| 7,440,365 B2 | 10/2008 | Hattori et al. |
| 7,441,124 B2 | 10/2008 | Hirasawa |
| 7,478,249 B2 | 1/2009 | Kii et al. |
| 7,502,070 B2 | 3/2009 | Yamaguchi et al. |
| 7,844,713 B2 | 11/2010 | Ikawa et al. |
| 2002/0176576 A1 | 11/2002 | Abe et al. |
| 2002/0188461 A1 | 12/2002 | Matsumoto |
| 2003/0227833 A1 | 12/2003 | Nonaka et al. |
| 2004/0013058 A1 | 1/2004 | Kudo |
| 2005/0047195 A1 | 3/2005 | Seung |
| 2005/0066139 A1 | 3/2005 | Inoue et al. |
| 2005/0179935 A1 | 8/2005 | Ogura et al. |
| 2005/0278388 A1 | 12/2005 | Butterworth et al. |

FOREIGN PATENT DOCUMENTS

| | | |
|---|---|---|
| EP | 1 300 849 A1 | 4/2003 |
| EP | 1 094 460 B1 | 12/2005 |
| JP | 62-229589 | 10/1987 |
| JP | 63-026889 | 2/1988 |
| JP | 01-162289 | 6/1989 |
| JP | 03-076082 | 4/1991 |
| JP | 05-128639 | 5/1993 |
| JP | 10-162508 | 6/1998 |
| JP | 11-234615 | 8/1999 |
| JP | 2000-113651 | 4/2000 |
| JP | 2001-189048 A | 7/2001 |
| JP | 2001-216766 A | 8/2001 |
| JP | 2001-357452 A | 12/2001 |
| JP | 2002-74825 A | 3/2002 |
| JP | 2002-208259 A | 7/2002 |
| JP | 2002-269904 | 9/2002 |
| WO | WO-02/065468 | 8/2002 |
| WO | WO-02/075741 | 9/2002 |

OTHER PUBLICATIONS

Japanese Office Action issued on Sep. 9, 2008 for corresponding Japanese Appln. No. 2007-166921.

| No. | FILE ID | ADDRESS |
|---|---|---|
| 1 | | |
| 2 | | |
| 3 | | |
| ⋮ | ⋮ | |
| N | | |

FIG. 9

| CD TRACK NUMBER | FILE ID |
|---|---|
| Tr #1 | ××××h |
| Tr #2 | ———— |
| Tr #3 | ××××h |
| Tr #N-1 | ———— |
| Tr #N | ———— |

| ALBUM TITLE | ×××××× | |
|---|---|---|
| Tr #1 | ××××× | D32(1) |
| Tr #2 | ———— | D32(2) |
| Tr #3 | ××××× | D32(3) |
| ⋮ | ⋮ | |
| Tr #N-1 | ———— | D32(N-1) |
| Tr #N | ———— | D32(N) |

D31 — ALBUM TITLE row
D32 — braces Tr#1 through Tr#N

FIG. 16
FRAME STRUCTURE
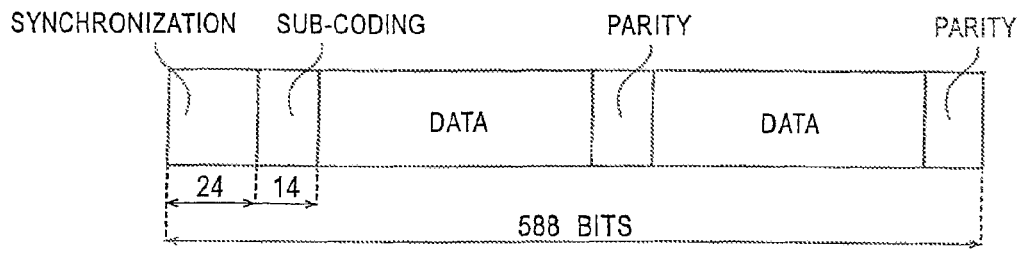
FIG. 17A
| FRAME | SUB-CODING FRAME |
|---|---|
| 98n+1 | SYNCHRONIZATION PATTERN (S0) |
| 98n+2 | SYNCHRONIZATION PATTERN (S1) |
| 98n+3 | $P_1$ $Q_1$ $R_1$ $S_1$ $T_1$ $U_1$ $V_1$ $W_1$ |
| 98n+4 | $P_2$ $Q_2$ $R_2$ $S_2$ $T_2$ $U_2$ $V_2$ $W_2$ |
| ⋮ | ⋮ |
| 98n+97 | $P_{95}$ $Q_{95}$ $R_{95}$ $S_{95}$ $T_{95}$ $U_{95}$ $V_{95}$ $W_{95}$ |
| 98n+98 | $P_{96}$ $Q_{96}$ $R_{96}$ $S_{96}$ $T_{96}$ $U_{96}$ $V_{96}$ $W_{96}$ |
| $98_{(n+1)}+1$ | |
FIG. 17B
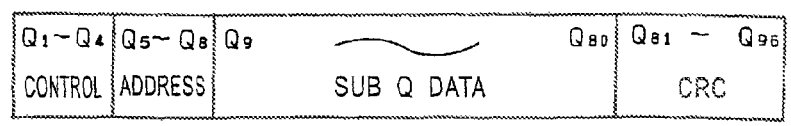

FIG. 19

| TNO | BLOCK | POINT | PMIN, PSEC, PFRAME | |
|---|---|---|---|---|
| 00 | n | 01 | 00.02.32 | START POINT OF TRACK #1 |
| | n+1 | 01 | 00.02.32 | |
| | n+2 | 01 | 00.02.32 | |
| | n+3 | 02 | 10.15.12 | START POINT OF TRACK #2 |
| | n+4 | 02 | 10.15.12 | |
| | n+5 | 02 | 10.15.12 | |
| | n+6 | 03 | 16.28.63 | START POINT OF TRACK #3 |
| | n+7 | 03 | 16.28.63 | |
| | n+8 | 03 | 16.28.63 | |
| | n+9 | 04 | . . | |
| | n+10 | 04 | . . | |
| | n+11 | 04 | . . | |
| | n+12 | 05 | . . | |
| | n+13 | 05 | . . | |
| | n+14 | 05 | . . | |
| | n+15 | 06 | 49.10.03 | START POINT OF TRACK #6 |
| | n+16 | 06 | 49.10.03 | |
| | n+17 | 06 | 49.10.03 | |
| | n+18 | A0 | 01.00.00 | TRACK NUMBER OF FIRST TRACK OF DISK |
| | n+19 | A0 | 01.00.00 | |
| | n+20 | A0 | 01.00.00 | |
| | n+21 | A1 | 06.00.00 | TRACK NUMBER OF LAST TRACK OF DISK |
| | n+22 | A1 | 06.00.00 | |
| | n+23 | A1 | 06.00.00 | |
| | n+24 | A2 | 52.48.41 | START POINT OF LEAD-OUT TRACK |
| | n+25 | A2 | 52.48.41 | |
| 00 | n+26 | A2 | 52.48.41 | |
| 00 | n+27 | 01 | 00.02.32 | REPEATED |
| | n+28 | 01 | 00.02.32 | |
| | . | . | . . | |
| | . | . | . . | |
| | . | . | . . | |

RECORDING APPARATUS, SERVER APPARATUS, RECORDING METHOD, PROGRAM AND STORAGE MEDIUM

This is a continuation of U.S. application Ser. No. 13/007,377, filed Jan. 14, 2011, which is a continuation of U.S. application Ser. No. 12/385,862, filed Apr. 22, 2009, which is a continuation of U.S. application Ser. No. 11/437,641, filed May 22, 2006, which is a continuation of U.S. application Ser. No. 10/484,633, filed Jan. 23, 2004, which is the National Stage of PCT/JP03/07411, filed Jun. 11, 2003, the entire contents of which is hereby incorporated by reference.

The present application claims priority based on Japanese Patent Application No. 2002-170901, filed Jun. 12, 2002, the entirety of which is being incorporated herein by reference.

TECHNICAL FIELD

The present invention relates to a recording apparatus that records, onto one recording medium, data recorded on another recording medium of a particular type, and managed by program, and a server apparatus that is able to download data to the recording apparatus connected thereto. The present invention also relates to a recording method for the recording apparatus, a program for embodying the recording apparatus and the recording method, and a recording medium storing the program.

BACKGROUND ART

Low-cost and large-capacity hard disks are currently in widespread use. One currently widely accepted practice is that audio data is compressed and recorded using the MP3 (MPEG Audio Layer III) method and the ATRAC (Adaptive Transform Acoustic Coding) method.

Along with this trend, so-called ripping is widely accepted. In the ripping operation, audio data recorded on a CD (Compact Disk) is compressed and recorded onto a hard disk for storage. The ripping operation is performed by personal computers, for example. Audio equipment may be supplied with a disk drive replaying the CD and a hard disk attached thereon. Such audio equipment may also perform the ripping operation.

If audio data such as a great deal of musical compositions is stored onto a hard disk through the ripping operation, a user is freed from inconveniences, such as replacing one CD with another CD having an album the user desires most to listen to, and enjoys music listening environment more than before.

When all content of the album of the CD, namely, all tracks (programs) recorded on the CD, are ripped in the ripping operation, all tracks recorded on the CD, which is a rip source, are unconditionally transferred to a hard disk for recording. In the discussion that follows, the term synchronized ripping refers to the recording of the tracks on the hard disk that is performed in synchronization with the content of the CD when all content of the album of the CD is transferred to the hard disk in the ripping operation.

Data is managed by program in media such as the CD. The program typically refers to as a track. In the description of this embodiment, the program recorded on the CD is also referred to as the track.

When the user rips data from a CD, music of some tracks only is frequently ripped from the CD.

For example, the user now desires to rip all tracks of the CD, from which the user has already dipped some tracks, and performs synchronized ripping on the CD.

In the CD synchronized ripping, as already discussed, all tracks recorded on the CD are unconditionally transferred to the hard disk for recording. Some tracks, which have already ripped, from among all tracks that are going to be ripped this time, are duplicated in the recording on the hard disk.

If the same tracks are duplicated on the hard disk, the capacity of the hard disk is consumed in vain. In other words, data that is already stored through a ripping operation is preferably prevented from being duplicated in the recording on the hard disk.

Another drawback is discussed below.

Time required to rip one CD is several minutes to tens of minutes depending on performance of a ripping system and replay time of the CD, and is not a short period of time. Time required to rip the CD is preferably shortened as much as possible.

If the ripping operation is performed in the CD synchronized ripping method, all tracks are replayed from the CD, and are transferred to the hard disk for recording. This means that tracks ripped in the past, expected to be duplicated, are also transferred from the CD to the hard disk.

The tracks that are going to be recorded in duplication are replayed from the CD and recorded on the hard disk. Ripping time is prolonged in vain accordingly. The CD synchronized ripping operation is not sufficient from the standpoint of fast operation.

To prevent the tracks from being recorded on the hard disk in duplication in the above-referenced CD synchronized ripping operation, a user must select tracks to be ripped from the tracks recorded on the CD before the ripping operation.

To select tracks, the user first must check to see whether the tracks recorded on the rip source CD are duplicated on the hard disk.

To check a duplication, the user must be provided with a user interface that allows the user to visually recognize the content of the tracks recorded on the CD and the content of the tracks currently recorded on the hard disk as a result of ripping. Such a user interface is typically available in the ripping system using a personal computer.

The user thus recognizes already ripped tracks using a system such as the above-mentioned personal computer. Dedicated ripping apparatuses typically have a small display on the body thereof, and it is not practical for the dedicated ripping apparatus to present the display of a track recorded on the rip source CD and a track already recorded on the hard disk. In this case, the user must replay the tracks recorded on the CD and the hard disk to check the duplication. Such an operation is inconvenient to the user.

The system such as the personal computer is usable, but the user must still perform a operation particular for checking and ease of use is not provided.

DISCLOSURE OF INVENTION

In view of the above drawback, it is an object of the present invention to provide a high-speed ripping technique in which when data that is recorded on a storage medium such as a CD by track (program) is ripped, already ripped tracks are not ripped in duplication.

To provide the high-speed ripping technique, the ripping operation is performed after the already ripped tracks are automatically recognized. The user thus enjoys the ease of use in the ripping operation.

To this end, a recording apparatus has the following structure.

The recording apparatus includes data reading means that reads, from a first recording medium that stores data and first management data for managing the data by program, the first management data and the data by program, recording means that records, onto a second recording medium, the data by program read by the data reading means, management data producing means that produces second management data that manages the data by program recorded on the second recording medium and the first managing data which is considered as being read and acquired by the data reading means from the first recording medium that has stored the data by program, with the data by program associated with the first management data, unrecorded program determining means that determines data by program considered as being unrecorded on the second recording medium, from among data by program stored in the first recording medium and to be read by the data reading means, by comparing the first management data read by the data reading means with the information content of the second management data, and control means that performs a control process to cause the data reading means to read the unrecorded data by program based on the determination result provided by the unrecorded program determining means, and to cause the recording means to record the unrecorded data by program read by the data reading means onto the second recording medium.

A server apparatus has the following structure.

The server apparatus is based on the assumption that a storage medium, as an album, storing data and management data for managing the data by program is present.

The server apparatus includes download data storage means that stores, as download data, data by program as the album, and the management data recorded on the storage medium as the album, data reading means that reads, from the download data storage means, data requested by program, and management data that is considered as being recorded on the storage medium as the album that stores the data by program, when the downloading of the data by program is requested through a network, and transmitting means that transmits, to the recording apparatus, the data by program and the management data read by the data reading means.

A recording method includes the following steps.

The data recording method includes a data reading step for reading, from a first recording medium that stores data and first management data for managing the data by program, the first management data and the data by program, a recording step for recording, onto a second recording medium, the data by program read in the data reading step, a management data producing step for producing second management data that manages the data by program recorded on the second recording medium and the first managing data which is considered as being read and acquired in the data reading step from the first recording medium that has stored the data by program, with the data by program associated with the first management data, an unrecorded program determining step for determining data by program considered as being unrecorded on the second recording medium, from among data by program stored on the first recording medium and to be read in the data reading step, by comparing the first management data read in the data reading step with the information content of the second management data, and a control step for performing a control process to read the unrecorded data by program in the data reading step based on the determination result provided in the unrecorded program determining step, and to record, in the recording step, the unrecorded data by program read in the data reading step onto the second recording medium.

A program includes the following processes.

The program causes the recording apparatus to perform a data reading process for reading, from a first recording medium that stores data and first management data for managing the data by program, the first management data and the data by program, a recording process for recording, onto a second recording medium, the data by program read in the data reading process, a management data producing process for producing second management data that manages the data by program recorded on the second recording medium and the first managing data which is considered as being read and acquired in the data reading process from the first recording medium that has stored the data by program, with the data by program associated with the first management data, an unrecorded program determining process for determining data by program considered as being unrecorded on the second recording medium, from among data by program stored on the first recording medium and to be read in the data reading process, by comparing the first management data read in the data reading process with the information content of the second management data, and a control process for reading the unrecorded data by program in the data reading process based on the determination result provided in the unrecorded program determining process, and for recording, in the recording process, the unrecorded data by program read in the data reading process onto the second recording medium.

A storage medium is constructed as below.

The storage medium causes the recording apparatus to perform a data reading process for reading, from a first recording medium that stores data and first management data for managing the data by program, the first management data and the data by program, a recording process for recording, onto a second recording medium, the data by program read in the data reading process, a management data producing process for producing second management data that manages the data by program recorded on the second recording medium and the first managing data which is considered as being read and acquired in the data reading process from the first recording medium that has stored the data by program, with the data by program associated with the first management data, an unrecorded program determining process for determining data by program considered as being unrecorded on the second recording medium, from among data by program stored on the first recording medium and to be read in the data reading process, by comparing the first management data read in the data reading process with the information content of the second management data, and a control process for reading the unrecorded data by program in the data reading process based on the determination result provided in the unrecorded program determining process, and for recording, in the recording process, the unrecorded data by program read in the data reading process onto the second recording medium.

In each of the above arrangements, the data by program and the first management data for managing the data by program are stored in the first storage medium as a rip source. With the server apparatus in use, the first management data is acquired from the server apparatus during downloading of data.

When the data of programs read from the first storage medium is recorded onto the second storage medium as a rip destination, the second management data is produced in a manner such that the data of programs recorded on the second storage medium is associated with the program managed by the first management data. The second management data allows the user to recognize the data of programs already recorded on the second storage medium and data of unrecorded programs from among the data of the programs recorded on the first storage medium.

To perform a replay for ripping in response to the result of recognition, only the data of programs unrecorded on the second storage medium are selected from the first storage medium and replayed to record the unrecorded programs on the second storage medium. Based on the second management data, the data of the programs already recorded on the second storage medium is not replayed from the first storage medium, and not ripped onto the second storage medium.

BRIEF DESCRIPTION OF THE DRAWINGS

FIG. 9 illustrates the structure of a ripping state table.

FIG. 10 illustrates the structure of a title table.

FIG. 16 illustrates a frame structure of a CD.

FIGS. 17A and 17B illustrate sub-coding of the CD.

FIG. 19 illustrates TOC data of the CD.

BEST MODE FOR CARRYING OUT THE INVENTION

The embodiments of the present invention will now be discussed in the order listed below.

Figure 1:
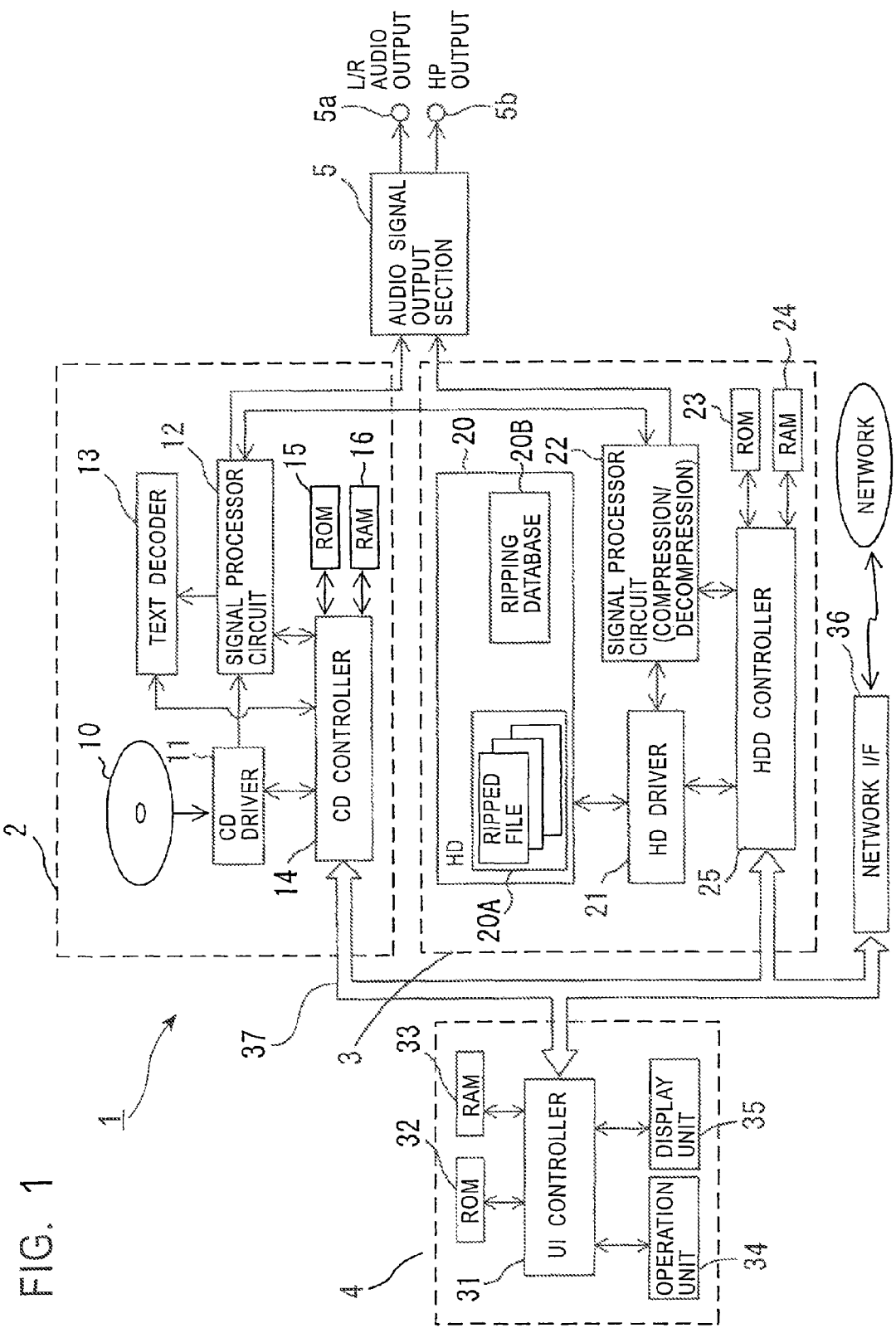
FIG. 1 is a block diagram illustrating the structure of a ripping system apparatus of one embodiment of the present invention.

1. Construction of Ripping System Apparatus
2. TOC and Sub Code of CD
3. Outline of the Operation of the Ripping System Apparatus
4. Ripping State Display
5. Structure of Ripping Database
6. Process of CD Synchronized Ripping
7. Cooperative Operation with Download Server
1. Construction of Ripping System Apparatus FIG. 1 is a block diagram illustrating the internal structure of a ripping system apparatus 1 as a recording apparatus in one embodiment of the present invention. In a ripping process, the ripping system apparatus 1 compresses digital audio data (hereinafter also referred to as track data) replayed from a CD by track using a predetermined digital audio data compression method and records the compressed track data onto a hard disk (HDD).

As shown in FIG. 1, the ripping system apparatus 1 of the present embodiment includes, as major elements thereof, a CD section 2, a hard disk drive (HDD) section 3, and a user interface section 4. The ripping system apparatus 1 also includes an audio signal output section 5 for outputting audio data, replayed by the CD section 2 or the HDD section 3, as an analog audio signal. Also included is a network interface 36 for connection with a network such as the Internet.

The CD section 2 is discussed first.

A CD 10 is loaded into the CD section 2, A CD driver 11 reads a signal from the CD 10 loaded in the CD section 2. As is well known, a laser light beam is directed to a signal surface of the CD with the CD 10 rotated by a CLV, for example, to read the signal from the CD. Signal reading is performed by detecting the reflected laser light beam.

A signal read by the CD driver 11 is input to a signal processor circuit 12. The signal read by the CD driver 11 is an RF signal. The signal processor circuit 12 generates a replayed RF signal and various servo control signals from the input RF signal.

The replayed RF signal is converted into 16 bit sampled digital audio data having a sampling frequency of 441 kHz through an EFM demodulation process, an error correction process, etc.

The digital audio data thus obtained is transferred to a signal processor circuit 22 in the HDD section 3 during a ripping operation. The digital audio signal, output to an audio signal output section 5, is subjected to required signal processes including a D/A conversion process, and amplification, and is then output to an audio output terminal 5a as an analog audio signal for an L/R stereo. The same output is applied to a headphone output terminal 5b.

A servo signal processing system is not shown here. With the various servo error signals extracted from the RF signal being fed back, the CD driver 11 side performs tracking servo control, focusing servo control, spindle motor rotation control, etc., as is known in the art.

A lead-in area of the CD records a TOC (Table Of Contents) representing the record content of the CD through sub-coding, as is well known. The signal processor circuit 12 extracts a sub code from the decoded digital audio data, and transfers the extracted sub code to the CD controller 14. In this way, information of the TOC recorded on the lead-in area as the sub code is extracted by the signal processor circuit 12, and is then acquired by the CD controller 14.

The CD-DA format permits text data to be recorded through sub coding. The text data typically includes, an album title as an album for the CD, title information concerning each track, information relating to the name of an artist, and is recorded in an ASCII code text data format.

The present embodiment includes a text decoder 13 for the text data.

The text decoder 13 is designed to receive a sub code extracted by the signal processor circuit 12, and extract text data from the input sub code. The CD controller 14 performs decode control so that the text decoder 13 acquires desired text data from a group of text data. The text data obtained in this way is written onto an RAM 16 for storage under the control of the CD controller 14.

The text data held in the RAM 16 is used in the following way in the present embodiment, for example.

For example, when the CD 10 is replayed on the CD section 2, information displayable by the text data, such as an album title of the CD 10 and a title of a track under replay, is displayed as a text on a display unit 35 as appropriate.

The CD controller 14 monitors the current operational status of the CD section 2, and waits on standby until a UI controller 31 sends a command for updating a display mode in response to an operation of an operation unit 34. The CD controller 14 reads required text data from the RAM 16 in response to the operational status and the command, and outputs the text data to the UI controller 31 through a system bus 37. The UI controller 31 displays the received and input text data on the display unit 35 as characters.

In the present embodiment, the digital audio data by track recorded on the CD 10 is subjected to a compression process, and is then recorded as a ripped file 20A on a hard disk 20. In this way, a so-called ripping operation for ripping data from the CD to the hard disk is performed.

The text data recorded on the CD 10 in the present embodiment is recorded onto the hard disk 20 as additional information concerning the ripped file 20A.

It is now assumed that the track replayed from the CD 10 in the ripping operation is recorded on the hard disk 20 as the ripped file 20A. The CD controller 14 then sends, to an HDD controller 25, the text data representing the album title of the CD on which the ripped track is considered as being recorded, and the title of the track.

The HDD controller 25 stores the transferred text data representing the album title and the track title in a ripping database 20B to be discussed later with the ripped file 20A associated with the text data.

In this arrangement, as long as the text data is stored on the rip source CD 10, information about the album title and the track title of the ripped file 20A is acquired from the text without the need for the user to perform an input operation.

When a replay list of the ripped files 20A is displayed or replayed for output, the display unit 35 displays the title of the album to which the ripped file 20A belongs, and the title of a musical composition of the ripped file 20A. In a display control process of the display unit 35, the HDD controller 25 reads desired text data from the ripping database 20B and transfers the text data to the UI controller 31 through the system bus 37. The UI controller 31 controls the display unit 35 to display the transferred text data as characters.

The CD controller 14 in the CD section 2 includes a CPU, for example, and controls the operation of the CD section 2. The CD controller 14 is also able to communicate, through the system bus 37, with the HDD controller 25 of the HDD section 3 to be discussed later and the UI controller 31 of the user interface section 4.

The CD controller 14 includes an ROM 15 and an RAM 16. The ROM 15 stores a program to be executed by the CD controller 14, and various setting information. The RAM 16 serves as a working area the CD controller 14 uses in the control process thereof, and holds various data the CD controller 14 temporarily needs to execute the control process.

The HDD section 3 is discussed below.

The signal processor circuit 22 in the HDD section 3 receives the digital audio data which has been replayed from the CD 10 for ripping and sent from the signal processor circuit 12 in the CD section 2 as described above.

The signal processor circuit 22 performs a compression process on the digital audio data coming in from the CD section 2 using a predetermined digital audio data compression method.

The compressed audio data, obtained as a result of the compression process of the signal processor circuit 22, is output to an HD driver 21 as record data to the hard disk 20. The HD driver 21 performs a record encoding process, appropriate for data writing to the hard disk 20, on the input compressed audio data, and transfers the processed data to the hard disk 20, and writes the processed data onto the hard disk 20 by designating an address thereon. In this way, the digital audio data replayed from the CD 10 is stored in the hard disk 20 in the compressed form thereof. In other words, the ripping operation has been accomplished.

By managing a file system for managing data such as a file recorded on the hard disk 20, the HD driver 21 appropriately executes a read/write operation of data.

The compressed audio data thus stored in the hard disk 20 is to be managed as the ripped file 20A as shown. Each ripped file 20A corresponds to the audio data per track recorded on the CD 10.

The hard disk 20 stores the ripping database 20B as management data for managing the ripped file stored in the hard disk 20.

In the ripping operation, the HDD controller 25 generates the ripping database 20B in response to the results of ripping, thereby successively updating the ripping database 20B.

The ripping system apparatus 1 in the present embodiment can select any file from among the ripped files 20A stored in the hard disk 20 and can replay the selected file.

In this case, the UI controller 31 issues a replay request after designating the ripped file 20A in response to a replay operation of the designated ripped file 20A performed on the operation unit 34 of the user interface section 4 to be discussed later. When the replay request reaches the HDD controller 25 through the system bus 37, the HDD controller 25 instructs the HD driver 21 to read the designated ripped file 20A. The HD driver 21 accesses an address having the designated ripped file written thereon on the hard disk 20 to read the data of the file, and transfers the read data to the signal processor circuit 22.

As already discussed, the ripped file 20A transferred from the HD driver 21 is compressed audio data. The signal processor circuit 22, which has received the data of the ripped file 20A, performs, on the data, a data decompression process corresponding to the above-mentioned audio data compression method. The signal processor circuit 22 thus converts the data into digital audio data having a predetermined sample bit and sampling frequency. The resulting signal is then output to the audio signal output section 5.

As already discussed, the audio signal output section 5 finally outputs the input digital audio data, as an analog audio signal, to the audio output terminal 5a and the headphone output terminal 5b.

The ripped file 20A stored in the hard disk 20 can be replayed as an audio sound.

The HDD controller 25, including a CPU, etc., executes the control process so that the HDD section 3 performs the operation that has been discussed.

THE HDD controller 25 also includes an ROM 23 and an RAM 24. The ROM 23 stores a program for the control process the HDD controller 25 must perform. The RAM 24 is a memory serving as a working area of the HDD controller 25.

The user interface section 4 will now be discussed.

The user interface section 4 includes the UI (User Interface) controller 31 containing a CPU, etc. The UI controller 31 controls the general function of the user interface section 4.

For example, the UI controller 31 converts operation information, output from the operation unit 34 in response to an operation performed on the operation unit 34, into a command (request information) the CD controller 14 and the HDD controller 25 can process, and transfers the command, through the system bus 37, to the CD controller 14 or the HDD controller 25.

In communication with the CD controller 14 and the HDD controller 25, the UI controller 31 performs display control so that the display unit 35 presents a display accounting for a current operational status.

An ROM 32 stores a program to cause the UI controller 31 to execute the operations of the user interface section 4 including the ones already described above, various initial setting information, etc. An RAM 33 is used as a working area for the UI controller 31.

The operation unit 34 includes a variety of controls provided on the apparatus body of the ripping system apparatus 1 in practice, and outputs an operational signal to the UI controller 31 in response to an actually performed operation on these controls.

In addition to the operation unit 34, one of a wired remote controller and a wireless remote controller may be used in one arrangement. The arrangement receives a signal responsive to an operation performed on the remote controller and outputs the signal to the UI controller 31.

In such a case, the network interface 36 may be connected to the system bus 37. With the network interface 36, the ripping system apparatus 1 of the present embodiment is connected to a network.

2, TOC and Sub Code of the CD

As is well known, the TOC is recorded using sub coding data in the lead-in area in the CD 10 (CD-DA) loaded in the CD section 2. The TOC and the sub code, recorded on the lead-in area, are discussed.

A minimum unit of data to be recorded onto the CD-DA is 1 frame, A total of 98 frames constitute 1 block (1 sub coding frame). The structure of 1 frame is shown in FIG. 16.

As shown, 1 frame is formed of 588 bits, leading 24 bits contain synchronization data, and subsequent 14 bits are a sub code data area, followed by data and parities.

One block is formed of 98 frames, each having the above-mentioned structure. Sub code data extracted from the 98 frames is collected into one block as listed in FIG. 17A.

The sub code data from a first frame and a second frame of the 98 frames (frame 98n+1 and frame 98n+2) has a synchronization pattern. A third frame to a 98th frame (frame 98n+3-frame 98n+98) form 96 bit channel data, namely, sub code data of P, Q, R, S, T, U, V, and W.

From among these, the P channel and the Q channel are used to manage access, etc. However, the P channel indicates only a pause section between tracks, and finer control is performed by the Q channel (Q1-Q96). The Q channel data of 96 bits is organized as shown in FIG. 7B.

Although the channel data is not discussed in detail, R channel data-W channel data are arranged to form text data group. The text decoder 13 shown in FIG. 1 extracts the text data, inserted in a predetermined format, from the R channel data-W channel data in the decode process thereof.

The text data may contain information such as an album title, a track title, names of players (including the name of a conductor and the name of an orchestra), the name of a lyric writer, the name of a composer, the name of an adapter, a message, a disk ID, genre, and ISRC. Which information to use may be left to the responsibility of each apparatus. In the present embodiment, at least the album title and the track title are used to manage the ripped file 20A.

Q1-Q4 of 4 bits, referred to as control data, are used for the number of audio channels, emphasis, and the identification of the CD-ROM.

More specifically, the 4 bit control data is defined as below.

| | |
|---|---|
| "0***" | 2 channel audio |
| "1***" | 4 channel audio |
| "*0**" | CD-DA |
| "*1**" | CD-ROM |
| "**0*" | digital copying disabled |
| "**1*" | digital copying enabled |

-continued

| | |
|---|---|
| "***0" | without pre-emphasis |
| "***1" | with pre-emphasis |

Q5-Q8 of 4 bits, being an address, are control bits of sub Q data.

The 4 bit address "0001" indicates that sub Q data of subsequent Q9-Q80 are audio Q data, and the 4 bit address "0100" indicates that the sub Q data of the subsequent Q9-Q80 is video Q data.

Q9-Q80 are the sub Q data of 72 bits, and the remaining Q88-Q96 are CRC.

The sub Q data recorded in the lead-in area forms the TOC.

Figure 18A:
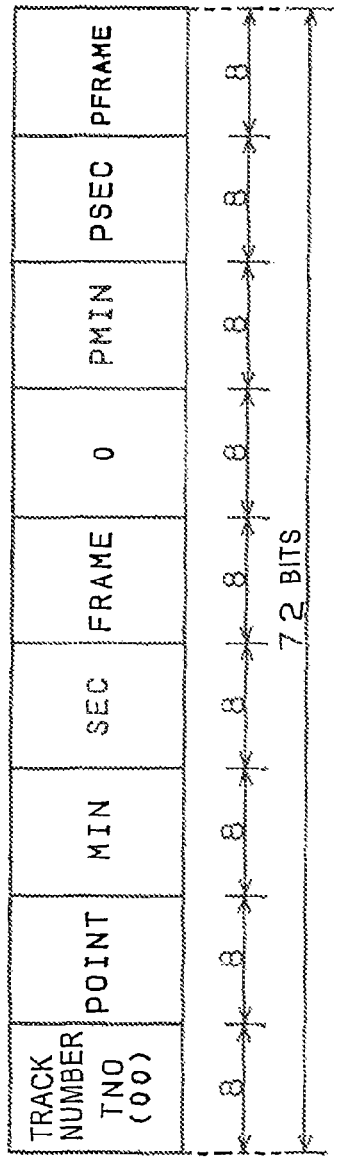
FIGS. 18A and 18B illustrate sub Q data of the CD.

The sub Q data of Q9-Q80 of 72 bits in the Q channel data read from the lead-in area contains information shown in FIG. 18A. Each of the sub Q data is 8 bit data.

Track numbers are also recorded. The track number in the lead-in area is fixed to "00".

In succession, POINT is recorded, followed by MIN (minute), and SEC (second), and FRAME (frame number) as time elapse within the track.

PMIN, PSEC, and PFRAME, recorded in succession, have the following definition based on the value of the POINT.

If the value of POINT is within a range of "01h"-"99h" (the letter h represents a hexadecimal number), that value represents a track number. In this case, a start point (absolute time address) of a track having the track number is recorded as minutes (PMIN), seconds (PSEC), and a frame number (PFRAME) in PMIN, PSEC, and PFRAME.

If the value of POINT is "A0h", the track number of a first track is recorded in PMIN. The value of PSEC discriminates between CD-DA, CD-I, and CD-ROM (XA specifications).

If the value of POINT is "A1h", the track number of last track is recorded in PMIN.

If the value of POINT is "A2h", the start point of a lead-out area is indicated as the absolute time address in PMIN, PSEC, and PFRAME.

For example, in a disk with 6 tracks recorded, the data shown in FIG. 19 is recorded as the TOC of sub Q data.

As shown, track numbers TNO are all "00h", A block NO. represents a number assigned to sub Q data of one unit read as the block data of 98 frames as described above.

The same TOC data is repeated for three consecutive blocks.

As shown, if the value of POINT is within a range of "01h"-"06h", start points of track #1-track #6 are indicated as PMIN, PSEC, and PFRAME.

If the value of POINT is "A0h", "01" is indicated as a first track number in PMIN. If the disk is discriminated as being the CD-DA by referring to the value of PSEC, PSEC="00h" is indicated as shown. In the case of the CD-ROM (XA specifications), PSEC="20h" is indicated, and in the case of the CD-I, PSEC is "10h".

With the value of POINT at "A1h", the track number of last track is recorded in PMIN, and with the value of POINT at "A2h", the start point of the lead-out area is indicated in PMIN, PSEC, and PFRAME.

On a block n+27 and subsequent blocks, the content of the block n through block n+26 is repeated.

Figure 18B:
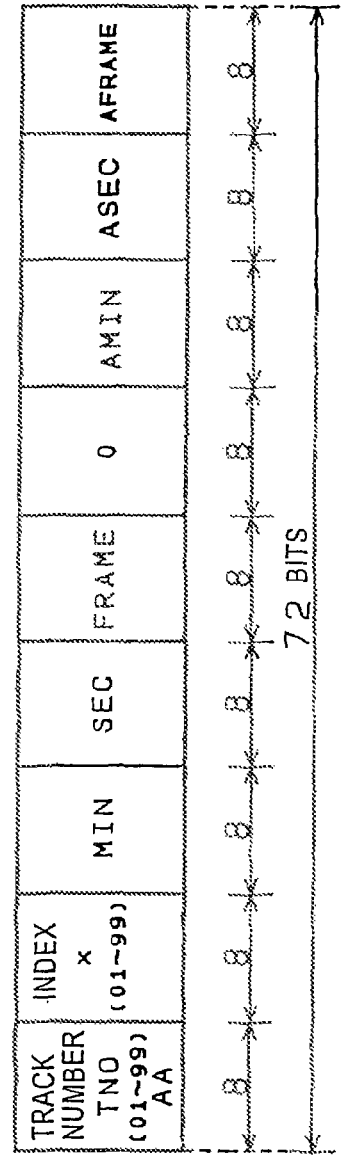

In track #1-track #n and the lead-out area of the disk 1 where data such as music is actually recorded, the sub Q data recorded there contains information of FIG. 18B.

A track number is recorded first. Each of track #1-track #n takes any of "01h"-"99h", A track number of the lead-out area is "AAh"

Recorded as an index is information that segments each track.

MIN (minutes), SEC (seconds), and FRAME (frame number) are indicated as the time elapse within the track.

Absolute time address is recorded as minutes (AMIN), seconds (ASEC), and a frame number (AFRAME) in AMIN, ASEC, and AFRAME.

The TOC and the sub code are organized in this way. It is understood that the address on the disk, namely, AMIN, ASEC, and AFRAME are recorded according to a unit of 98 frames.

The 98 frames (1 block) are referred to as 1 sub coding frame. Sound data for 1 second contains 75 sub coding frames. More specifically, the "AFRAME" as an address takes a value within a range from "0"-"74".

3. Outline of the Operation of the Ripping System Apparatus

The CD synchronized ripping operation of the ripping system apparatus 1 of the present embodiment illustrated in FIG. 1 will now be discussed with reference to FIG. 2.

For clarification of discussion, the CD synchronized ripping in the context of this description means the recording operation in which data by album of all tracks, with one album corresponding to a single CD, is recorded onto the hard disk 20 as the ripped file 20A as a result of the ripping operation.

Figure 2:
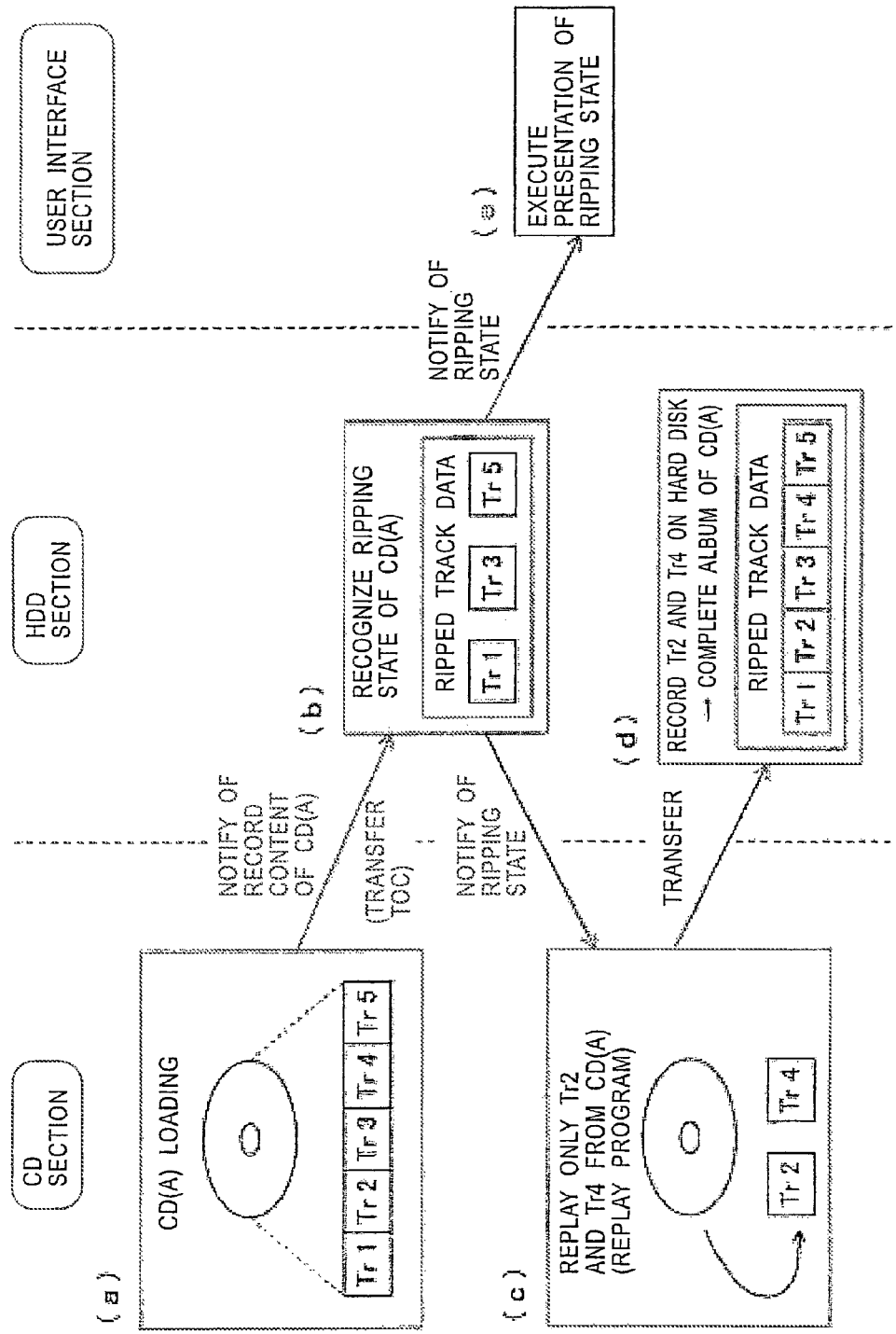
FIG. 2 diagrammatically illustrates a CD synchronized ripping operation of the present embodiment.

FIG. 2 illustrates operational sequences of the CD section 2, the HDD section 3, and the user interface section 4 from the loading of the CD 10 as a rip source into the CD section 2 to the completion of the CD synchronized ripping of the present embodiment.

As shown in FIG. 2(a), the CD 10 as a rip source is loaded into the CD section 2. The CD here is a CD(A).

The CD(A) has data of five tracks from Tr1-Tr5 recorded as shown in FIG. 2(a). The CD section 2 accesses the lead-in area of the CD(A), thereby reading the TOC. The CD section 2 transfers the content of the TOC to the HDD section 3. The CD section 2 notifies the HDD section 3 of the record content of the CD(A).

Upon receiving the record content of the CD(A), the HDD section 3 compares the record content of the received TOC with the ripping state of a ripped file already recorded on the hard disk 20. The ripping state of the hard disk 20 is learned by referencing the ripping database 20B. The structure of the ripping database 20B will be discussed later.

Based on the results of comparison, the HDD section 3 determines whether any file of the ripped file 20A currently stored in the hard disk 20 is already recorded as the file of a track recorded on the CD(A) as a content. If any ripped file 20A is already recorded, the HDD section 3 recognizes which track of the CD(A) the ripped file 20A corresponds to. More specifically, the HDD section 3 recognizes the ripping state with respect to the tack data of the CD(A).

Referring to FIG. 2(b), the result of recognition indicates that each of three tracks Tr1, Tr2, and Tr3 of the CD(A) is already stored on the hard disk 20 as the ripped files 20A.

The HDD section 3 notifies the CD section 2 of the recognized ripping state of the CD(A). Similarly, the HDD section 3 notifies the user interface section 4 of the ripping state.

The operation of the user interface section 4 responsive to the notification of the ripping state will be discussed later in connection with the "ripping state display". The operation of the CD section 2 notified of the ripping state is discussed first.

Upon receiving the notification of the ripping state concerning the CD(A) as shown in FIG. 2(c), the CD section 2 can recognize which of the track data recorded on the CD(A) is unripped and unrecorded track data on the hard disk 20. To this end, the CD section 2 must compare the content of the TOC read from the CD(A) with the content of the notified ripping state.

In this case, two tracks Tr2 and Tr4, out of the track data recorded on the CD(A), are recognized as unrecorded data.

When a command is issued to perform the DC synchronized ripping on the currently loaded CD(A), the CD section 2 replays only the data of the unrecorded tracks Tr2 and Tr4 out of the tracks Tr1-Tr5 recorded on the CD(A) as shown in FIG. 2(c), and transfers the data of the unrecorded tracks Tr2 and Tr4 to the HDD section 3.

As is well known, ordinary CD players perform a so-called programmed replay to replay data on a track selected by a user in a replay order designated by the user. To allow the CD section 2 to replay the unrecorded tracks only as described above, program setting for replay is controlled by the CD controller 14, for example, rather than by the user.

FIG. 2(d) illustrates the operation of the HDD section 3 that has received the replayed data of the tracks Tr2 and Tr4 transferred from the CD section 2 as described above. The HDD section 3 compresses the data of the received tracks Tr2 and Tr4 as described above, and transfers the compressed data to the hard disk 20 for recording. This completes the ripping operation of the data of the tracks Tr2 and Tr4 replayed from the CD(A).

As a result, as shown in FIG. 2(d), the HDD section 3 has recorded the data of all tracks Tr1-Tr5 recorded on the CD(A) on the hard disk 20 as the ripped files 20A. In other words, the files of all tracks forming the album as the CD(A) are completed as the ripped files 20A stored in the hard disk 20.

As a result, all data of the tracks by album corresponding to the single CD is recorded on the hard disk 20 as the ripped files 20A. The CD synchronized ripping has been normally completed.

In the known art as already discussed, the CD synchronized ripping operation replays all tracks recorded on the CD and transfers the tracks to the hard disk for recording in an unconditional manner. The CD synchronized ripping operation duplicates track data if the track data has already been ripped to the hard disk. Unless the duplicated track data is deleted, the capacity of the hard disk is consumed in vain.

When all track data recorded on the CD is unconditionally recorded in the CD synchronized ripping operation, the track data, already ripped to the CD from the track data recorded on the CD as a rip source, is also replayed and recorded onto the hard disk. Resulting ripping time becomes useless.

For example, to overcome this problem, a user has learned a ripped file expected to be duplicated by displaying a ripped file list using a powerful GUI of a personal computer, and has set a program for CD replaying. This process is troublesome to the user.

However, in accordance with the present embodiment, the communication, performed between the CD section 2 and the HDD section 3 as already discussed with reference to FIG. 2, determines the track data unrecorded as a ripped file from among the track data recorded on the CD as the rip source.

Based on the result of determination, only the unrecorded track data is replayed and ripped during CD synchronized ripping.

In this arrangement, the track data already ripped to the hard disk is not duplicated in recording during the CD synchronized ripping operation.

Since the unrecorded track data only is replayed and output during the actual CD synchronized ripping operation, the CD synchronized ripping operation is finished earlier than in the conventional art if ripped track data is present.

The present embodiment not only avoids useless duplication of the ripped file, but also reduces the time required for CD synchronized ripping (performs the ripping operation at a high speed). Operations required to avoid duplication and to achieve high-speed ripping, such as the recognition of the unrecorded track and the replay of the unrecorded track only, are all automatically performed. The user is thus freed from the troublesome operation and steps.

4. Ripping State Display

As already illustrated in FIGS. 2(b) and 2(e), the CD section 2 also notifies the user interface section 4 of the ripping state of the track data corresponding to the CD(A). Upon receiving the notification of the ripping state as illustrated in FIG. 2(e), the user interface section 4 presents a ripping state display on the display unit 35.

FIG. 3A through FIG. 3D illustrate display examples of the ripping state display presented on the display unit 35. The ripping state display visually presents what percent of all tracks (data) recorded on the currently loaded rip source CD is already ripped to the hard disk 20.

Figure 3A:
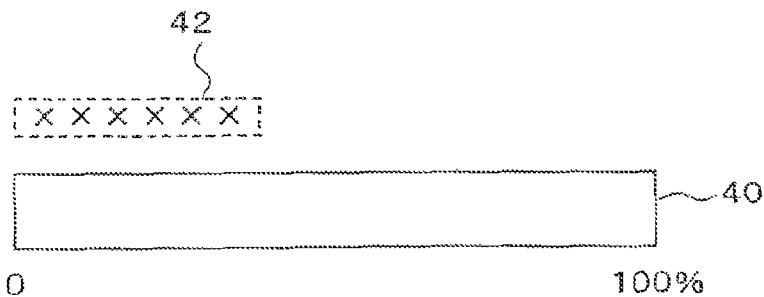
FIGS. 3A through 3D illustrate a display example of ripping state.

A ripping state display bar 40 is presented as the ripping state display as shown in FIG. 3A. The ripping state display bar 40 has the longitudinal direction thereof extending horizontally because the display unit 35 is mounted on the case of the ripping system apparatus 1 with the longitudinal direction of the display screen thereof aligned with the horizontal direction.

In this case, an album title display 42 is also presented on the display screen. The album title display 42 accounts for the content of the text data of the album title stored in the ripping database 20B having a structure to be discussed later.

The display status of the ripping state display bar 40 illustrated in FIG. 3A corresponds to the case in which no track data, out of the track data recorded on the rip source CD, is ripped to the hard disk 20.

Figure 3B:
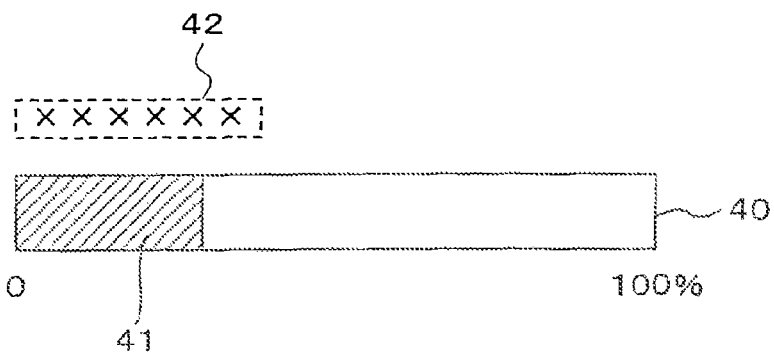

In contrast, if some of the track data is ripped, a ripped state display bar 41 is shown, overwriting the ripping state display bar 40 in accordance with the percentage of the ripped track data to the track data of the rip source CD as shown in FIG. 3B.

Figure 3C:
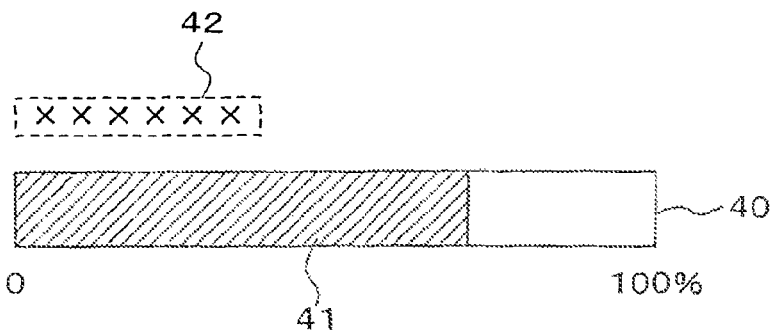

If more track data is ripped, the percentage of the ripped status display bar 41 to the ripping state display bar 40 is increasing as shown in FIG. 3C.

FIG. 3A through FIG. 3D display symbolically the ripping state using a bar graph.

Figure 3D:
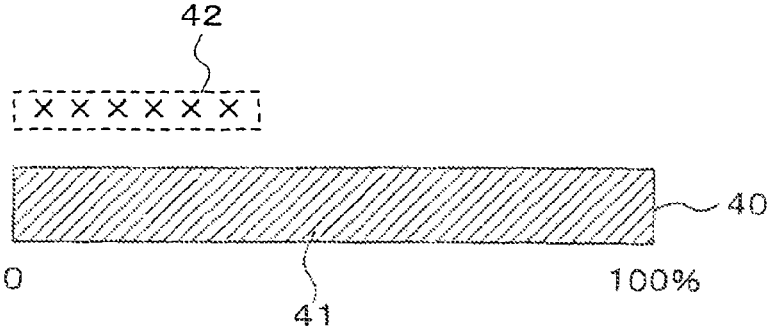

If all track data of the rip source CD is ripped, the ripped status display bar 41 fully overwrites the entire ripping state display bar 40 as shown in FIG. 3D.

FIG. 4A through FIG. 4D illustrate another example of ripping state display.

Figure 4A:
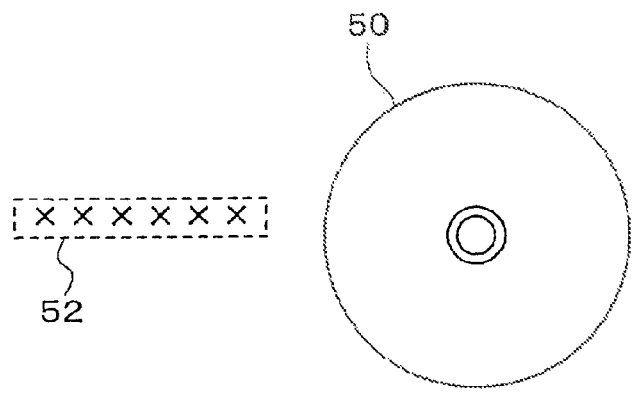
FIGS. 4A through 4D illustrate another display example of the ripping state.

As shown in FIG. 4A, a ripping state display icon 50 is displayed instead of the ripping state display bar 40 shown in FIG. 3A through FIG. 3D. In this case, the ripping state is symbolically represented as an amount of record to the single disk as an album. Also in this case, an album title display 52 is displayed together with the ripping state display icon 50.

The display status shown in FIG. 4A corresponds to the case in which no track data, out of the track data recorded on the rip source CD, is ripped to the hard disk 20.

Figure 4B:
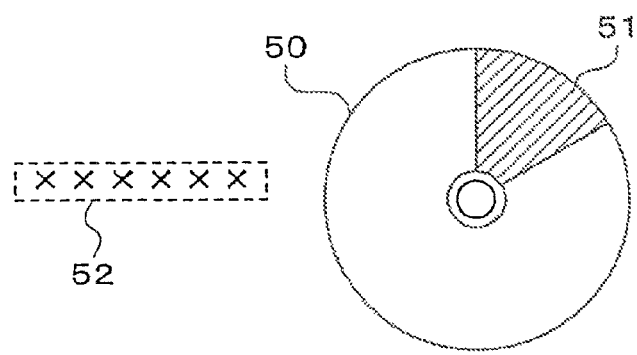
Figure 4C:
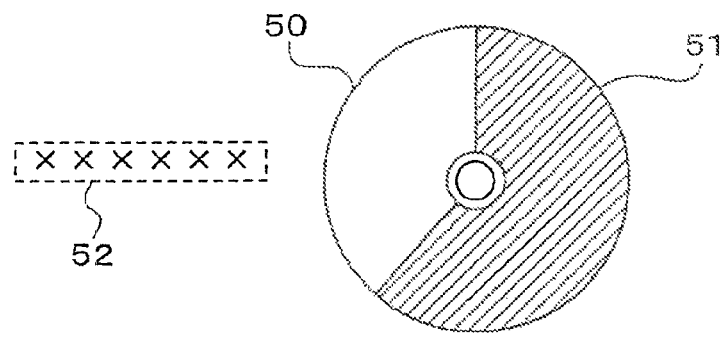

Some of the track data is now ripped. The ripped status display 51 having a sector of a central angle responsive to the percentage of the ripped track data to all track data recorded on the rip source CD is shown in the ripping state display icon 50 as illustrated in FIG. 4B through FIG. 4C.

Figure 4D:
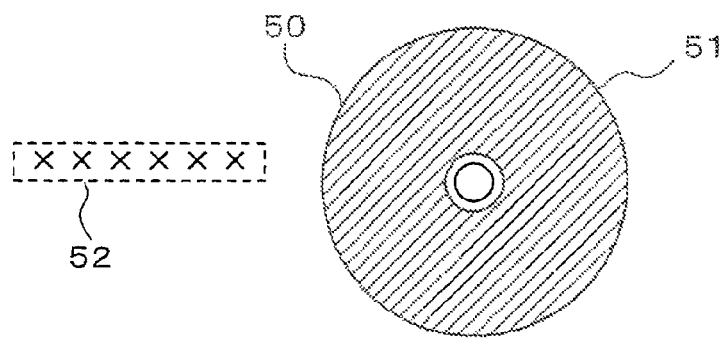

If all track data of the rip source CD is ripped, the ripped status display 51 fully overwrites the ripping state display icon 50 as shown in FIG. 4D.

The display unit 35 in the present embodiment symbolically displays the ripping state as illustrated in FIG. 3A through FIG. 3D and FIG. 4A through FIG. 4D. Viewing the display unit 35, the user intuitively recognizes how much track data recorded on the CD loaded in the CD section 2 as a rip source is already ripped.

The user thus visually enjoys such a symbolic display.

The displays of audio apparatuses are substantially smaller in size than the display screen of the personal computer. If the ripping state is listed on the audio apparatus display, legibility of the ripping state may be degraded. The use of the symbolic ripping state display in the present embodiment presents the ripping state in a sufficiently legible condition even in the small display size thereof.

The percentage of the ripped status display bar 41 to the ripping state display bar 40 shown in FIG. 3A to FIG. 3D, and the percentage of the ripped status display 51 to the ripping state display icon 50 shown in FIG. 4A to FIG. 4D are considered to be based on the size of the summed ripped track data to the size of the data of all tracks of the rip source CD. In other words, the percentages are considered to be based on the number of ripped track data to the number of all tracks of the rip source CD.

For example, it is not always necessary that, in the actual display in FIG. 3A to FIG. 3D and FIG. 4A to FIG. 4D, the percentage of the ripped status display bar 41 to the ripping state display bar 40, and the percentage of the ripped status display 51 to the ripping state display icon 50 faithfully account for the actual percentage of the ripped track data to all tracks of the rip source CD.

More specifically, a display pattern for the case where no ripped track data is present as shown in FIG. 3A and FIG. 4A and a display pattern for the case where all track data of the rip source CD are ripped are prepared. At least one display pattern for the case where part of track data of the rip source CD is ripped is prepared. At least, a total of three display patterns depending on the percentage is prepared.

Depending on the notified ripping state, one of the prepared display patterns is selected, and the selected display pattern is presented on the display unit 35.

The display pattern is at a level of determined number of levels depending on the ripping state. This arrangement provides the advantage that a burden on a display control process of the UI controller 31 is reduced in comparison with precisely displaying the percentage of the ripped track data to all tracks of the rip source CD. Even if the performance of CPUs and the resolution of the display are not so high, the symbol display of the present embodiment is effectively used.

The above arrangement indicates a rough percentage of the tripped track data to the user. In many cases, the user just desires to know whether no track data at all or some track data is ripped, and the above arrangement is sufficiently practical.

5. Structure of Ripping Database

To perform the CD synchronized ripping process as the present embodiment shown in FIG. 2, the unrecorded track data out of the track data recorded on the rip source CD must be recognized.

As already briefly discussed with reference to FIG. 2, the content of the TOC of the CD 10 transferred from the CD section 2 is compared with the required content of the ripping database 20B stored in the hard disk 20.

The structure of the ripping database 20B will now be discussed.

Figures 5, 6:
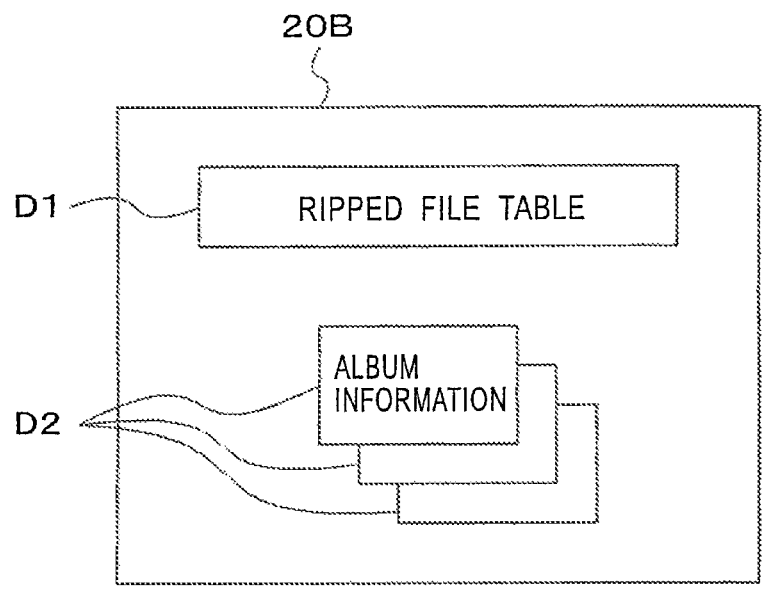
FIG. 5 illustrates the structure of a ripping database.
FIG. 6 illustrates the structure of a ripped file table.

FIG. 5 illustrates the general structure of the ripping database 20B. As shown, the ripping database 20B is composed of a ripped file table D1 and album information D2.

The structure of the ripped file table D1 is illustrated in FIG. 6. As shown, the ripped file table D1 is formed as a table that associates a file ID attached to each ripped file 20A with an address on the hard disk 20 storing the ripped file 20A represented by the file ID.

The album information D2 is management data for managing the ripped file 20A by album. The album here corresponds to the CD on which the ripped file 20A has originally been recorded.

Figure 7:
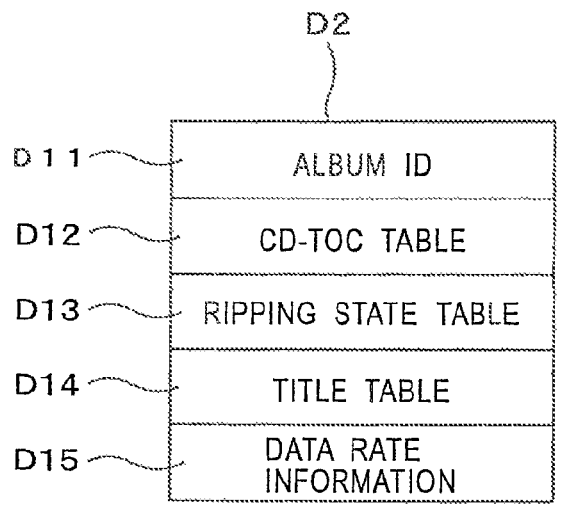
FIG. 7 illustrates the structure of album information.

The album information D2 has a structure illustrated in FIG. 7, for example.

As shown, the album information D2 contains an album ID D11, a CD-TOC table D12, a ripping state table D13, a title table D14, and data rate information D15.

The album ID D11 stores the value of the ID identifying the CD (album) corresponding to the album information D2. The album ID is generated by the HDD controller 25 in accordance with a predetermined rule when the album information D2 is produced.

The album ID is used when the HDD section 3 manages the ripped file 20A by album.

The ripping operation illustrated in FIG. 2 refers to the CD synchronized ripping. In accordance with the present embodiment, the notification of the record content of the rip source CD is exchanged between the CD section 2 and the HDD section 3 even when the user selects a part of the track data from the CD for ripping in an operation which is not the CD synchronized ripping operation. In other words, the information content of the TOC read from the rip source CD is transferred.

The CD-TOC table D12 is generated based on the information content of the TOC that is transferred from the CD section 2 to the HDD section 3 when a CD having none of the track data thereof ripped is replayed for ripping for the first time as a rip source CD. As long as the CD is ripped to the hard disk 20 for the first time, the CD-TOC table D12 is generated regardless of whether the ripping operation is the CD synchronized ripping or another ripping operation.

Figure 8:
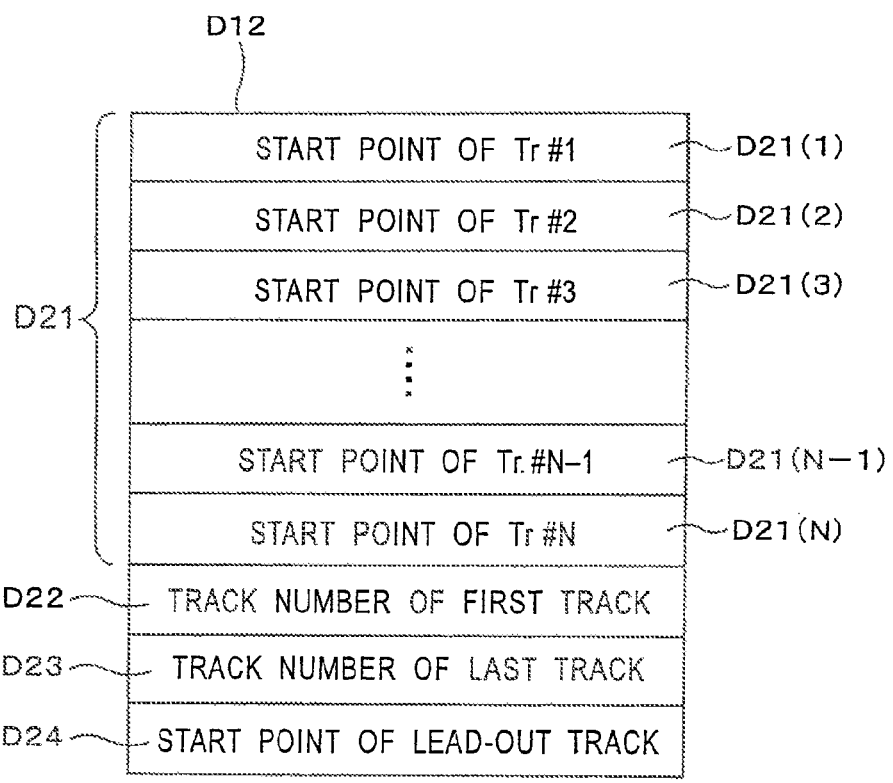
FIG. 8 illustrates the structure of a CD-TOC table.

The CD-TOC table D12 has the content directly accounting for the TOC content recorded on the rip source CD as shown in FIG. 19, and has the structure illustrated in FIG. 8, for example.

The CD-TOC table D12 illustrated in FIG. 8 includes start point areas D21.

As illustrated in FIG. 19, the TOC of the CD indicates a start point (address) for each track recorded on the disk. The content of the start point for each track is accounted for in the start point area D21.

As illustrated in FIG. 8 for example, the values of the start points for the tracks Tr#1-Tr#N are stored in areas D21(1), D21(2), . . . D21(N−1), and D21(N), respectively. The areas D21(1)-D21(N) store the same values as the start points of track #1-track #N recorded in the TOC of the CD.

The values stored in the areas D21(1)-D21(N) may be represented by MIN, SEC, and FRAME in the same way as in the TOC of the CD.

The track number of a first track is stored in an area D22 in succession to the start point area D21. The value to be stored in the area D22 may be the track number of the first track of the disk illustrated in FIG. 19.

The track number of a last track is stored in a succeeding area D23. The value to be stored in the area D23 may be the track number of the last track of the disk illustrated in FIG. 19.

The last area D24 indicates the value of the start point of a lead-out track by MIN, SEC, and FRAME as in the CD-TOC.

The start point of the lead-out track also accounts for the value of the start point of a lead-out track recorded in the TOC of the CD.

In succession, the ripping state table D13 is discussed.

The ripping state table D13 is a table where each track (namely, a track recorded in a rip source CD) belonging to the album managed by current album information is associated with track data recorded on the hard disk 20 as the ripped file 20A.

In the structure of the ripping state table D13 as shown in FIG. 9, the track number of a track managed by the TOC on the rip source CD is associated with the file ID of the ripped file 20A.

If the track data of the rip source CD to which the current album information is considered to correspond is already recorded as the ripped file 20A, the file ID of the ripped file 20A is associated with the track number of the CD, and is then stored in the ripping state table D13.

As shown in this figure, the file ID is represented by ["xxxxh"] (h represents a hexadecimal format), but a real value of the file ID is stored in practice. A row of a file ID corresponding to a track number not associated as being unrecorded is represented by ["----"], but consecutive values of 00h (all 0's) or FFh (all 1's) are stored there in practice.

The file ID here is identical to the file ID that is attached to each ripped file 20A and has already been discussed with reference to the ripped file table shown in FIG. 6.

The title table D14 is an area where the title of an album and the track title of the track belonging to the album are stored using text data.

The title table D14 has a structure as shown in FIG. 10, for example. The title table D14 contains an album title area D31 where the text data as an album title is stored.

The album title area D31 is followed by a track title area D32. The track title area D32 is partitioned into areas D32(1)-D32(N) storing text data of the track titles of the tracks Tr#1-Tr#N.

If the text data of the album title has been acquired, the text data is stored in the album title area D31.

If the text data of the track title of the ripped track data is acquired with the ripped track data present as the ripped file 20A, the text data is stored in the area, corresponding to the track number of the track data, from among the areas D32(1)-D32(N) of the track title area D32.

Text information of the album title and the track title to be stored in the title table D14 are acquired in the following manner.

If the rip source CD has a record of the text data of the album title and the track title at the time of a ripping operation, the text decoder 13 in the CD section 2 decodes and acquires the text data. In this case, the CD controller 14 transfers the acquired text data of the album title and the track title to the HDD section 3. The HDD controller 25 in the HDD section 3 stores the in-coming text data of the album title and the track title in the title table D14.

If the rip source CD has no record of the text data of the album title and the track title, a tentative album title and a tentative track title are stored in the following manner during the ripping operation.

As for the album title, the HDD controller 25 produces the tentative album title in accordance with a predetermined rule, and stores the produced album title in the album title area D31.

As for the track data, which will be discussed in detail later, the HDD controller 25 produces, as the text data, the track number of the album corresponding to the ripped file 20A ripped this time. The HDD controller 25 stores the text data in the area, corresponding to an appropriate track number, from among the areas D32(1)-D32(N) of the track title area D32.

The data rate information D15 (see FIG. 7) in the album information D2 contains information representing a data rate set for the album. The data rate is the one for the audio data obtained subsequent to the compression process of the signal processor circuit 22 in the HDD section 3.

In the present embodiment, the user may modify the data rate, at which the signal processor circuit 22 compresses the audio data, by operating the operation unit 34.

The data rate must be common to all track data (ripped files 20A) within unit of album managed by the album information D2 in accordance with the present embodiment. For example, if a given single piece of track data, recorded on the same rip source CD, is set to a different data rate and is recorded as a ripped file 20A on the hard disk 20, that ripped file 20A, even from the same track data, is managed as a different album.

6. Process of CD Synchronized Ripping

The process for performing the CD synchronized ripping operation in accordance with the above-referenced present embodiment will now be discussed.

The process is discussed with reference to a flowchart illustrated in FIG. 11. The process corresponds to the operation discussed with reference to FIGS. 2(a), 2(b), and 2(c).

The HDD section 3 learns the ripping state corresponding to the rip source CD in the course of the loading the CD as a rip source into the CD section 2 and the transfer of the content of the TOC from the CD section 2 to the HDD section 3. The process also corresponds to the operation to the ripping state displaying of the user interface section 4 in response to the ripping state learned by the HDD section 3.

Figure 11:
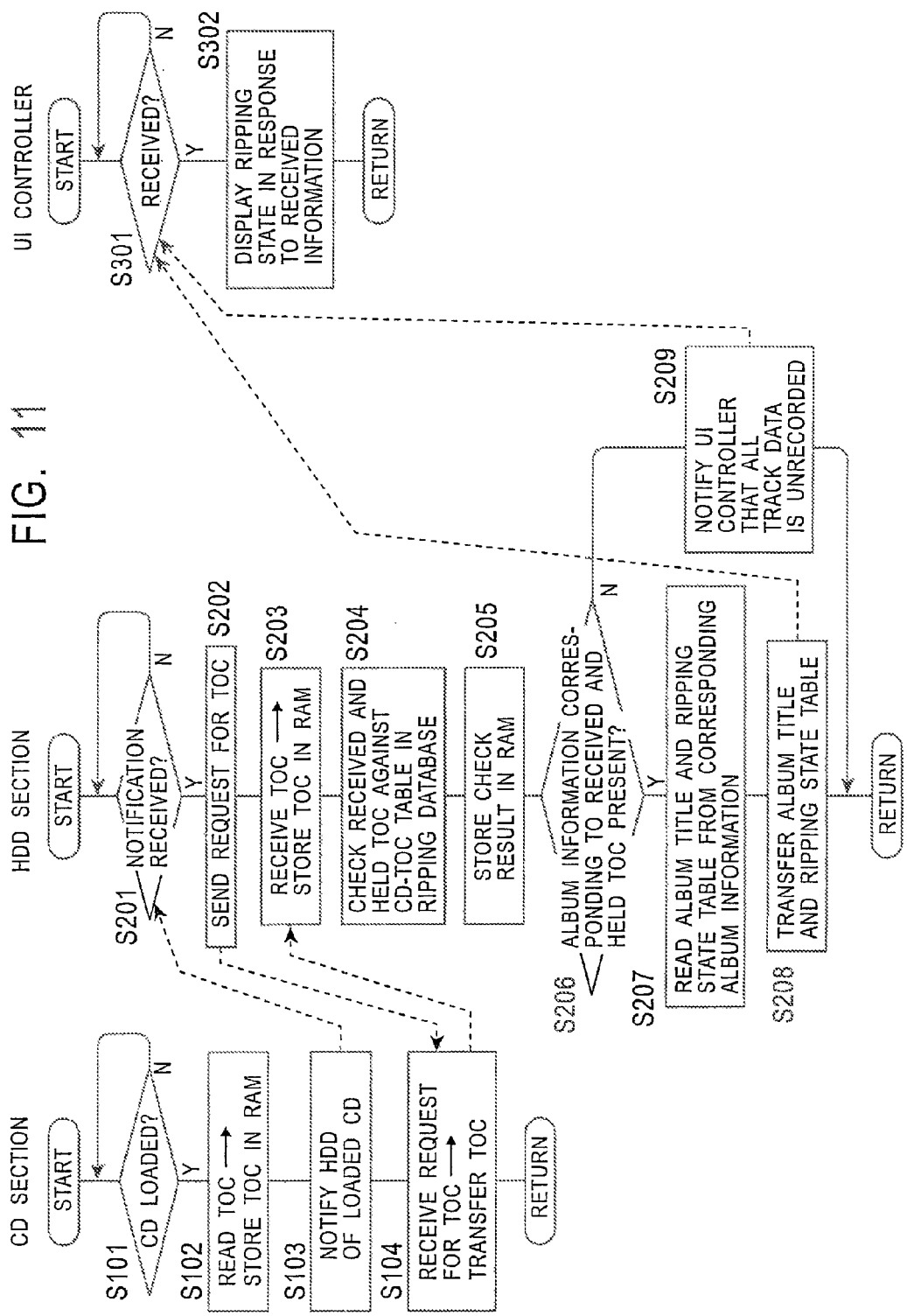
FIG. 11 is a flowchart of a process of the ripping system apparatus of the present embodiment before a ripping state of a CD is recognized.

FIG. 11 also illustrates the operations of the CD section 2, the HDD section 3, and the UI controller 31. The process of the CD section 2 is executed by the CD controller 14. The process of the HDD section 3 is executed by the HDD controller 25.

In the algorithm illustrated in FIG. 11, in a process step in step S101, the CD section 2 waits on standby until the CD 10 is loaded as a rip source. If it is determined that the CD 10 is loaded, the algorithm proceeds to step S102.

In step S102, the TOC is read from the loaded disk, and is held in the RAM 16. In a process step in step S103, the loading of the CD 10 is notified of.

In step S201, the HDD section 3 waits on standby for the reception of the notification information, notifying of the loading of the CD, sent in step S103. If the notification information is received, the algorithm proceeds to step S202. The HDD section 3 requests the TOC of the currently loaded CD 10 from the CD controller 14 in the CD section 2 through the system bus 37.

Upon receiving the request for the TOC, the CD controller 14 performs a process step in step S104. In step S104, the CD controller 14 reads the TOC that has been held in the RAM 16 in the process step in step S102, and transfers the read TOC to the HDD controller 25 through the system bus 37.

In a process step in step S203, the HDD section 3 (HDD controller 25) receives the TOC thus transferred. The content information of the TOC thus received is held in the RAM 24.

In a succeeding step S204, the content of the TOC held in the RAM 24 is checked against the CD-TOC table in the album information D2 corresponding to the TOC in the ripping database 20B stored in the hard disk 20. More specifically, the HDD section 3 searches for the CD-TOC table matching the content of the TOC held in the RAM 24. In a process step in a succeeding step S205, the result of check is held in the RAM 24.

If the CD-TOC table matching the content of the TOC held in the RAM 24 is present, the album ID D11 of the album information D2 that stores the CD-TOC table is held as the check result. If the CD-TOC table matching the content of the TOC held in the RAM 24 is not present, a predetermined value indicating no presence of match is held as the check result.

The HDD section 3 uses the check result to recognize the ripped track data out of the track data corresponding to the rip source CD at the start of the CD synchronized ripping as will be discussed later with reference to FIG. 12.

In succession, the HDD section 3 performs a process step in step S206.

In a succeeding step S206, the HDD section 3 references the check result held in the RAM 24, thereby determining whether the album information D2 corresponding to the TOC received and held (namely, the currently loaded rip source CD) is present (registered in the ripping database 20B).

If an affirmative answer is obtained in step S206, at least one of track data recorded on the rip source CD currently loaded in the CD section 2 is already recorded on the hard disk 20 as a ripped file 20A. In this case, the algorithm proceeds to a process step in step S207.

In step S207, the HDD section 3 searches the ripping database 20B stored in the hard disk 20 for the album information D2 corresponding to the rip source CD loaded in the CD section 2. This searching may be performed using, as a search condition, the album ID held in the RAM 24 as the check result obtained in step S205.

If the album information D2 is found in the searching, the HDD section 3 reads the text data of the album title stored in the album title area D31 in the title table D14 stored in the album information D2. The HDD section 3 also reads the ripping state table D13. In a succeeding step S208, the text data of the read album title is transferred to the UI controller 31. Based on the read ripping state table D13, the HDD section 3 produces percentage information indicating the percentage of the ripped track data to all tracks of the CD loaded in the CD section 2, and transfers the percentage information to the UI controller 31 through the system bus 37.

If a non-affirmative answer is obtained in step S206, the algorithm proceeds to step S209. The non-affirmative answer in step S206 means that none of the track data recorded in the rip source CD loaded in the CD section 2 is ripped and recorded at all on the hard disk 20.

In step S209, the HDD section 3 notifies of the ripping state, telling that the track data corresponding to the CD loaded in the CD section 2 is all unrecorded. In this case, the text data of the tentative album title produced in the HDD section 3 may be sent. In this way, the display unit 35 tentatively displays the album title in the album title display 42 (or 52).

In step S301, the UI controller 31 receives the text data of the album title and the percentage information of the ripping state, both transferred by the HDD section 3 in step S208. Alternatively, the UI controller 31 may receive information notified of by the HDD section 3 in a process step in step S209.

If any of the above information is received in step S301, the algorithm proceeds to step S302. In response to the received information, the UI controller 31 controls display control of the display unit 35 so that the ripping state display shown in FIGS. 3A-3D or FIGS. 4A-4D is presented together with the album title display (42 or 52).

The process of the CD synchronized ripping operation that starts subsequent to the end of the process illustrated in FIG. 11 is discussed with reference to a flowchart illustrated in FIG. 12. Referring to FIG. 12, the operations of the CD section 2 (CD controller 14) and the HDD section 3 (HDD controller 25) are shown.

In the process shown here, the HDD section 3 determines in step S401 whether a command to start the CD synchronized ripping is obtained.

If an operation to perform the CD synchronized ripping is performed on the operation unit 34, and the UI controller 31 receives the operational information, a command to start the CD synchronized ripping is sent, through the system bus 37, to the HDD controller 25 in the HDD section 3 and the CD controller 14 in the CD section 2.

If the HDD controller 25 determines in step S401 that the command to start the CD synchronized ripping is obtained, the process in step S402 and in subsequent steps is executed.

In step S402, the HDD section 3 references the check result that is held in the RAM 24 in step S205 as illustrated in FIG. 11. In a succeeding step S403, the HDD section 3 determines the current ripping state of the CD (album) now loaded in the CD section 2 based on the referenced check result.

If already ripped track data is present, the RAM 24 holds, as the check result, the album ID of the album information D2 corresponding to the CD loaded as a rip source in the CD section 2. The ripping database 20B is thus referenced for the content of the ripping state table D13 stored in the album information D2 having that album ID. The HDD section 3 determines whether all track data of the rip source CD is ripped or whether a portion of the track data remains unripped.

If the RAM 24 holds, as the check result, the value indicating that all track data of the current rip source CD remains unripped, it is determined that all track data of the rip source CD are still in an unripped state.

If the determination result in step S403 is that a portion of the track data is in an unripped state, the algorithm proceeds to step S406.

In step S406, the album information D2 to be ripped is set. The setting of the album information D2 to be ripped is to determine album information D2 the content of which must be updated in the CD synchronized ripping operation this time.

Some tracks remain unripped in this case. In other words, the remaining tracks are already ripped, and the album information corresponding to the CD currently loaded as the rip source in the CD section 2 is already present in the hard disk 20. In step S406, the album information stored in the ripping database 20B is set as the album information to be ripped, in accordance with the CD currently loaded as the rip source in the CD section 2.

More specifically, the album information D2 having the album ID, which is held in the RAM 24 as the check result in step S205 shown in FIG. 11, is set to be the album information to be ripped.

Subsequent to the process step in step S406, a process step in step S407 is performed.

If it is determined in step S403 that all tracks remain unripped, the algorithm proceeds to step S404.

In step S404, new album information D2 is registered in the ripping database 20B. In this case, information that may be produced as the new album information D2 is stored.

More specifically, a value as the album ID is produced in accordance with a predetermined rule, and is stored as the album ID D11. The CD-TOC table D12 is produced using the information of the TOC that is held in the previous step S203.

For the ripping state table D13, the area of the track number corresponding to the file ID is reserved based on the information of the TOC. For the title table D14, the area of, at least, the album title area D31 and the track title areas D32(1)-D32(N) of the respective track data is reserved.

For the data rate information D15, the value of the data rate set at the start of the operation of the CD synchronized ripping may be stored.

If the registration of the new album information D2 is completed in step S404, the algorithm proceeds to step S405.

In step S405, the album information D2 to be ripped is set. Here, the album information D2 newly registered in step S404 is set to be ripped. The algorithm proceeds to step S407.

The data rate information D15 illustrated in FIG. 7 is stored for the album information D2. As already discussed in connection with the data rate information D15 with reference to FIG. 7, the data rate represented by the data rate information D15 is common to the ripped files 20A (track data) belonging to the album information. In other words, tracks from the same rip source CD, if ripped at different data rates, are managed as different albums. The hard disk 20 allows a plurality of albums different in data rate to be present on the hard disk 20 even if the albums are derived from the same rip source CD.

The data rate information D15 in the album information D2 is also referenced in step S403 for the determination of the ripping state of the album and in step S406 for the setting of the album information to be ripped.

Even if the album information ripped from the track data of the rip source CD this time is present in step S403, all tracks are determined as being unripped if the data rate indicated by the data rate information D15 in the album information D2 is different from the data rate set in the CD synchronized ripping this time. The algorithm then proceeds to step S404.

In the process sequence from step S403 to step S406, the album information to be set for ripping in step S406 is the album information having the data rate information D15 storing the same value as the data rate set in the CD synchronized ripping this time.

In step S407, the track data not yet ripped in the current album is recognized by referencing the ripping state table D13 of the album information D2 set for ripping in a process step in step S405 or step S406. In this way in step S407, through the system bus 37, the HDD section 3 notifies the CD section 2 what track number the unrecorded track data recognized by referencing the ripping state table D13 has. For example, the HDD section 3 produces and sends a list of track numbers of unrecorded track data. For clarification of the discussion, the list of all track numbers is transferred in the process step in step S407 performed subsequent to the process step in step S406.

As in the process step of the HDD side in S401, in step S501, the CD section 2 waits on standby until a command to start the CD synchronized ripping is provided. As already discussed, the command to start the CD synchronized ripping is issued by the UI controller 31 in response to the operation performed by the user on the operation unit 34. Upon receiving the command, the CD section 2 proceeds to a process step in step S502.

In step S502, the CD section 2 waits on standby for the reception of the information of the list of the track numbers of unrecorded (unripped) track data, notified of by the HDD section 3 in the process step in the previous step S407. Upon receiving the notification, the CD section 2 proceeds to a process step in step S503.

In step S503, the CD section 2 registers a replay program based on the notification received in the above step S502 so that the unrecorded track only is replayed, and proceeds to step S504.

In step S504, the CD section 2 executes the track replay on the loaded CD 10 in accordance with the program registered in the above step S503. In a process step in a succeeding step S505, the CD section 2 performs a control process to transfer the audio data replayed from the CD 10 to the signal processor circuit 22 of the HDD section 3.

The replay process of the CD 10 in step S504, and the transfer process of transferring the replayed data in step S505 are continued as a succeeding step S506 until the completion of replay is determined. The completion of replay means that both the program repay and the transfer of the replay data are completed.

If the completion of replay is determined in step S506, the algorithm proceeds to step S507. The CD section 2 notifies the HDD controller 25 in the HDD section 3 of the completion of the replay.

In step S408, the HDD section 3 performs a control process to record the replayed data, transferred to the signal processor circuit 22 from the CD section 2 in the previous step S505, onto the hard disk 20 to manage the replayed data by a unit of the ripped file 20A.

More specifically, the signal processor circuit 22 performs a control process to compress the transferred audio data at a designated data rate. Since the compressed audio data is the data that is originally managed by track, the HD driver 21 is controlled so that a single piece of track data is managed as a single ripped file 20A on a file system in the recording of the data onto the hard disk 20.

The process step in step S408 is continued until the notification of the completion of the replay, to be sent by the CD section 2 in the previous step S507, is received in step S409. When the notification of the completion of the replay is received in step S409, the algorithm proceeds to step S410.

After verifying that the recording of the audio data transferred from the CD section 2 onto the hard disk 20 is completed, the HDD section 3 performs a required recording end process in step S410, and proceeds to step S411. As for the recording end process in step S410, the HDD section 3 may also output the notification of the end of the CD synchronized ripping to the UI controller 31. Upon receiving the notification, the UI controller 31 executes a control process on the display unit 35 to display the end of the CD synchronized ripping. In this way, the user visually recognizes the end of the CD synchronized ripping.

In step S411, the ripped file table D1 and the album information D2 set for ripping are updated in accordance with the result of the CD synchronized ripping this time.

More specifically, information that associates the file ID of the ripped file 20A newly recorded in this CD synchronized ripping operation with the address on the hard disk 20 is added to the ripped file table D1.

The file ID of the ripped file 20A newly recorded in this CD synchronized ripping operation is stored with an appropriate track number of the ripping state table D13 associated therewith.

The text data of the track title of the ripped file 20A newly recorded in this CD synchronized ripping operation is stored with the track title area D32(1)-D32(N) of the appropriate track number of the title table D14 associated therewith. A specific process for storing the track title in accordance with the present embodiment will be discussed later with reference to FIG. 13.

When the process step in step S411 is performed as discussed above, the algorithm proceeds to step S412. In a process step in step S412, ripping state data (the information of percentage of the ripped tracks to all tracks of the album) responsive to the content of the ripping state table D13 of the album information D2 updated in the above step S411 is sent to the UI controller 31.

The process of the UI controller 31 that has received the ripping state data remains unchanged from the process in steps S301 and S302 already shown in FIG. 11.

With the CD synchronized ripping performed, all track data be to she album are now in a ripped state. For this reason, the ripping state display presented on the display unit 35 based on the ripping state data becomes a display in which all track data as the album is ripped as shown in FIG. 3D and FIG. 4D.

If it is determined in the previous step S403 that all track data belonging to the album corresponding to the currently loaded rip source CD is ripped process step in step S413 is performed.

In step S413, the HDD section 3 notifies the CD controller 14 that all tracks of the album are ripped. The CD section 2 stops the operation corresponding to the CD synchronized ripping in response to the reception of the notification, although the process step is not shown. The notification may be output to the UI controller 31. Since all tracks are ripped, the UI controller 31 performs display control on the display unit 35 to notify that the CD synchronized ripping operation is not executed. In this case, the CD synchronized operation is regarded as being immediately terminated, and a display notifying of the end of the CD synchronized ripping may be immediately presented on the display unit 35.

Figure 12:
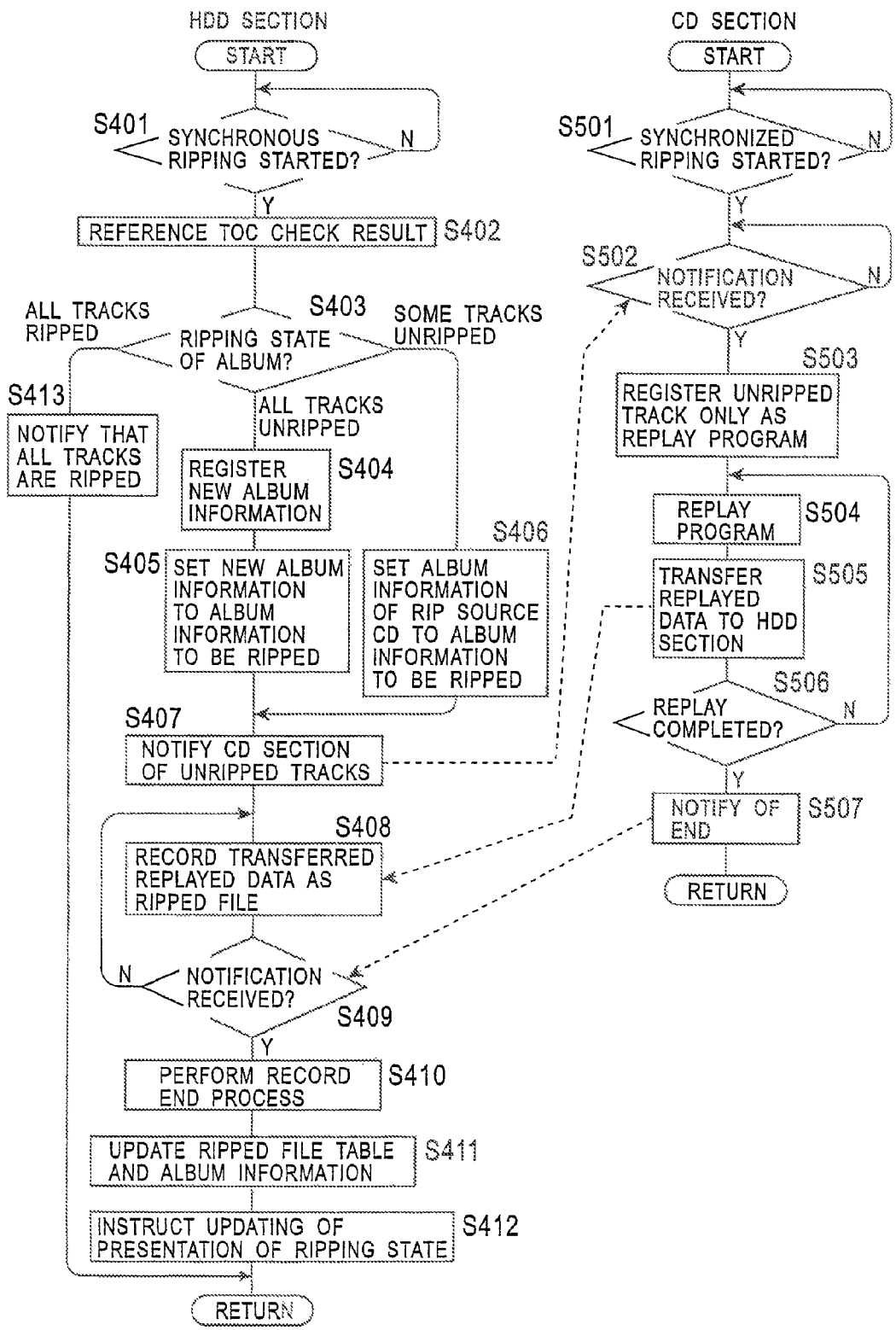
FIG. 12 is a flowchart of a process of the ripping system apparatus of the present embodiment illustrating the execution of the synchronized ripping operation.
Figure 13:
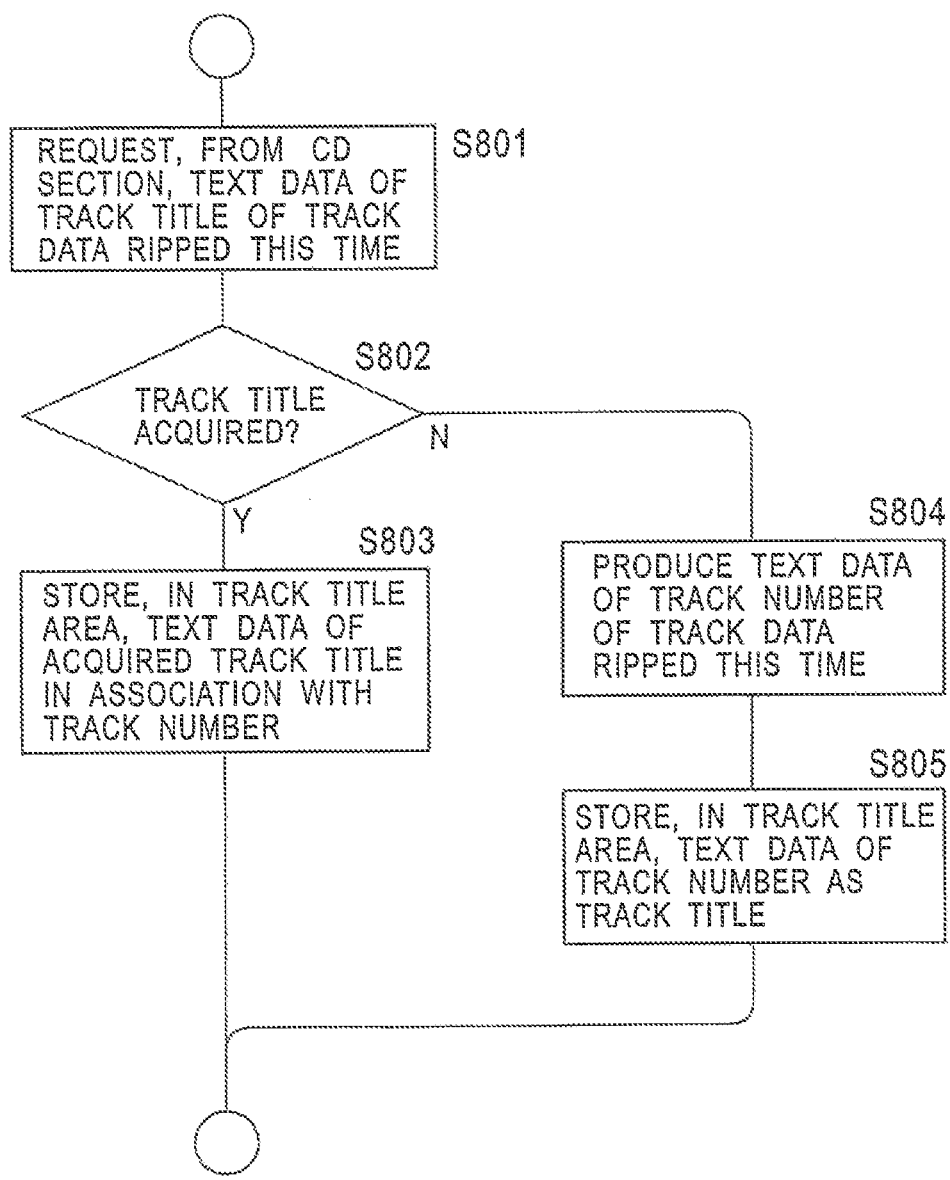
FIG. 13 is a flowchart illustrating a process in which a registration operation for registering a track title corresponding to newly recorded ripped data is performed.

It has already been discussed that, in the present embodiment, the text data of the track title of the track data (ripped file 20A) newly recorded on the hard disk 20 is stored in the title table D14 within the album information D2 in the process in step S411 illustrated in FIG. 12. The HDD controller 25 performs that process as illustrated in FIG. 13.

As shown, the HDD controller 25 requests the text data of the track title from the CD controller 14 in the CD section 2 in a process step in step S801. In this case, the CD controller 14 requests the track title corresponding to the track number of the track data (ripped file 20A) newly recorded on the hard disk 20 in the course of this CD synchronized ripping process.

As already discussed with reference to FIG. 1, the CD section 2 having the text decoder 13 therewithin decodes a sub code to demodulate text data if there is the text data recorded on the CD through sub coding, and stores the demodulated text data in the RAM 16.

If the RAM 16 stores the data of the track title of the track data (track number) requested in the process step in the above-mentioned step S801, the CD controller 14 reads the data of the track title from the RAM 16, and transfers the data of the track title to the HDD controller 25. If no data of the track title is stored in the RAM 16, the CD controller 14 transfers, to the HDD controller 25, a response indicating that a transfer of the data is impossible because of no data available in the RAM 16.

In response to the process step of the CD controller 14, the HDD controller 25 determines in step S802 whether the text data of the track title has been acquired from the CD section 2.

If the answer in step S802 is affirmative, the algorithm proceeds to step S803. In step S803, the text data of the acquired track title is associated with and stored onto a track title area (D32(1)-D32(N)) of an appropriate track number in the title table D14. In this way, the track title, such as a specific title of a musical composition, about the ripped track data is automatically registered in the ripping database 20B.

If the answer in step S802 is non-affirmative as being that the text data of the track title is not recorded on the rip source CD, the algorithm proceeds to step S804.

In step S804, the HDD controller 25 produces text data representing the track number of the track data ripped this time. For example, if the track number of the track data ripped this time is track Tr#1, the HDD controller 25 produces text data [track 1] to indicate the track Tr#1. If a plurality of pieces of tack data is ripped this time, the HDD controller 25 produces the text data of the track numbers of all track data.

In step S805, the text data of the track number, produced in step S804, is treated as a track title, and is associated with and stored onto the track area (D32(1)-D32(N)) of an appropriate track number of the title table D14.

In this case, a specific title, such as the title of a musical composition, is not registered. The track number is still presented as a track title different from the case in which no track title is present at all. For example, when the track title is displayed to replay and output the ripped file 20A or to display a replay list, the track number is displayed. The user recognizes the file much more easily than the case in which no title is presented at all.

7. Cooperative Operation with Download Server

With the network interface 36 incorporated, the ripping system apparatus 1 of the present invention is connectable to a network. Using the network connection function, the ripping system apparatus 1 downloads digital audio data as a musical composition from a predetermined download server present in the same network, and stores the digital audio data in the hard disk 20 as a ripped file 20A.

A cooperative operation of the ripping system apparatus 1 of the present embodiment with the download server is discussed below.

Figure 14:
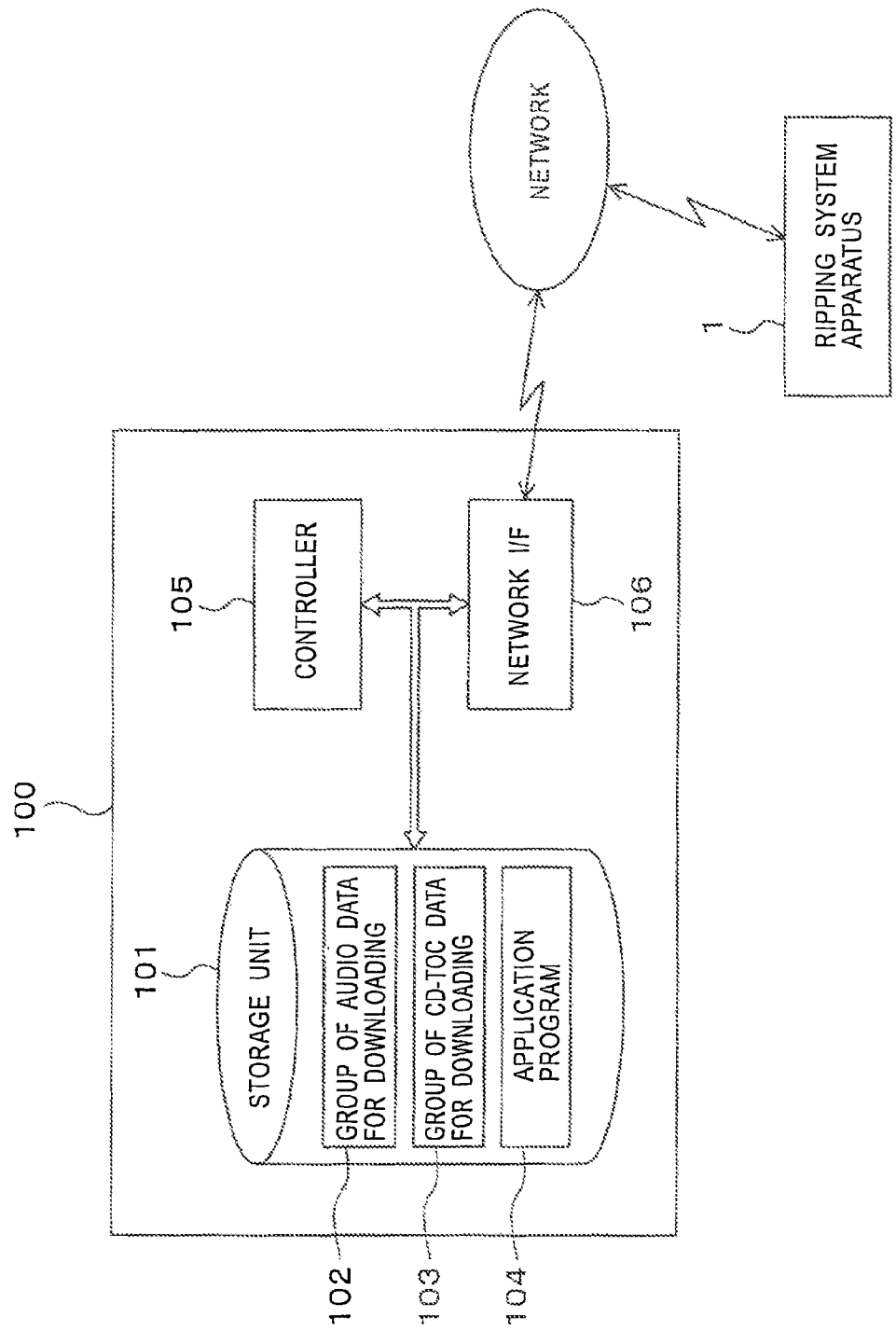
FIG. 14 is a block diagram illustrating the structure of a download server of the present embodiment.

FIG. 14 illustrates the structure of a download server 100 that is connected to the ripping system apparatus 1 of the present embodiment through the network.

As shown, the download server 100 shown here includes a storage unit 101, a controller 105, and a network interface 106, mutually connected to each other through a system bus.

The storage unit 101 includes a large capacity hard disk, for example. As shown, the storage unit 101 stores a download audio data group 102, a download CD-TOC data group 103, and an application program 104.

A number of pieces of audio data, stored to be downloaded, in the form of database are stored as the download audio data group 102. Each audio data constituting the download audio data group 102 is compressed using the same compression method of the ripped file 20A in the present embodiment. It is contemplated that a compression process is performed on uncompressed audio data when the uncompressed audio data is recorded as the ripped file 20A subsequent to downloading. To save time required for downloading, compressing beforehand the download audio data is preferable and widely accepted.

The download CD-TOC data group 103 is arranged in the form of database in which the TOC data having the same content as the one recorded on the album as the CD is recorded on each of a number of albums.

Audio data forming the download audio data group 102 is track data actually recorded on the CD as any album. The download CD-TOC data group 103 is formed of the CD-TOC corresponding to the album (CD) to which the audio data (track data) forming the download audio data group 102 belongs.

The application program 104 is formed of a variety of programs the controller 105 must execute.

The controller 105 performs a variety of required processes to execute the functions as a download server based on the application program 104 stored in the storage unit 101.

The network interface 106 is arranged to connect the download server 100 to the network. The download server 100 is thus connected to and communicates with a plurality of ripping system apparatuses 1 present in a remote place through the network.

The structure of the ripping system apparatus 1 illustrated here has been discussed, and is connected to the download server through the network interface 36 and the network shown in FIG. 1.

A download operation executed between the download server 100 thus constructed and the ripping system apparatus 1 is performed as discussed below.

The user of the ripping system apparatus 1 connects the ripping system apparatus 1 to the download server 100 through the network by performing a predetermined operation on the display unit 35. In this case, the UI controller 31 issues, to the HDD controller 25, a connection request for connection with the download server 100 in response to the connection operation for connection with the download server 100 performed on the display unit 35.

Communication control using the network interface 36 may be performed by any of the CD controller 14, the HDD controller 25, and the UI controller 31. Here, the HDD controller 25 has the responsibility to perform the communication control.

In response to the input of the connection request, the HDD controller 25 establishes connection with the network through the network interface 36, and executes control process to access an address (URL (Uniform Resource Locator)) of the download server 100 over the network. In this way, the ripping system apparatus 1 is now in the connected condition thereof to the download server 100 through the network.

Under this condition, the download server 100 can send list information of the download audio data to the ripping system apparatus 1. The list information has the structure in which a list item of downloadable audio data is associated with a data ID of that audio data. The ripping system apparatus 1 displays the received and acquired list information on the display unit 35 as a download list. Alternatively, the download list may be displayed on a connectable external display device, although not shown in FIG. 1.

For example, the user of the ripping system apparatus 1 selects and designates the audio data to be downloaded, and performs an operation to download the designated audio data by performing a GUI operation on the replay list displayed as discussed above. As in the process shown in FIG. 15, the ripping system apparatus 1 executes a download operation to download the audio data from the download server 100 in response to the operation.

The download operation will be discussed with reference to a flowchart illustrated in FIG. 15. The flowchart illustrated in FIG. 15 covers the processes of the ripping system apparatus 1 and the download server 100.

The process of the ripping system apparatus 1 may be executed by any of the CD controller 14, the HDD controller 25, and the UI controller 31, as appropriate. The communication control process through the network interface 36 is executed by the HDD controller 25, as already discussed.

The process of the download server 100 is performed by the controller 105.

When the operation to execute the downloading process is performed on the operation unit 34 in the ripping system apparatus 1 as discussed above, the UI controller 31 recognizes the operation. The UI controller 31 extracts the data ID of the audio data, designated for downloading, from among IDs contained in the list information. The UI controller 31 outputs a command to execute the downloading process together with the data ID to the HDD controller 25.

In response to the input command, the HDD controller 25 performs a control process to send a download request to the download server 100 in a process step in step S601. More specifically, the HDD controller 25 produces download request information, and sends, to the network interface 36 through the system bus 37, the produced download request information together with the data ID of the audio data to be downloaded. The HDD controller 25 performs a control process to send the download request information containing the data ID to the download server 100 through the network interface 36.

In step S701, the download server 100 waits on standby until the download request information sent from the ripping system apparatus 1 is received. Upon receiving the download request information, the download server 100 proceeds to step S702.

In step S702, the download server 100 searches the download audio data group 102 stored in the storage unit 101 for the audio data in response to the received download request information. For example, the download server 100 searches for the audio data matching the data ID contained in the received request information.

As already discussed, each audio data constituting the download audio data group 102 has the same content recorded as the track data in any CD. The TOC concerning the CD that has recorded the audio data of the download audio data group 102 is stored in the download CD-TOC data group 103. A pointer to the CD-TOC having the record of the audio data is attached to the audio data forming the download audio data group 102.

If the audio data is searched in the download audio data group 102 in step S702, the pointer to the CD-TOC attached to the searched audio data is referenced, and the CD-TOC indicated by the referenced pointer is searched in the download CD-TOC data group 103.

In the process step in step S702, the download server 100 searches for the audio data requested by the ripping system apparatus 1 and the CD-TOC identical to the TOC recorded on the CD that has recorded the audio data.

In step S703, the download server 100 performs a control process to transfer the audio data and the CD-TOC, acquired in the searching in the above-mentioned step S702, to the network interface 106, thereby designating the address (an IP address, for example) of the requesting ripping system apparatus 1 to request the ripping system apparatus 1 to send the address. In this way, the information of the audio data and the CD-TOC is sent to the requesting ripping system apparatus 1 through the network as download data.

After sending the download request in the previous step S601, the ripping system apparatus 1 waits on standby until the download data responsive to the download request is received in step S602. Upon receiving the download data, the ripping system apparatus 1 proceeds to step S603.

In step S603, the ripping system apparatus 1 determines whether the CD-TOC data contained in the received and acquired download data has been registered as the album information D2 in the ripping database 20B stored in own hard disk 20. In other words, the ripping system apparatus 1 determines whether the album information D2 having the CD-TOC data (the content of the album) identical in content to the CD-TOC data acquired as the download data is present. In the determination process, the ripping system apparatus 1 checks the CD-TOC table D12 stored in each of the album information D2 stored in the hard disk 20 against the content of the received and acquired CD-TOC for matching. If a match is found, the CD-TOC data is already registered. If no match is found, the CD-TOC data is not yet registered.

In the above case, a determination process is also performed on the data rate.

More specifically, even if the CD-TOC received as the download data is identical to the content of the CD-TOC table D12 of the CD section 2, the album information is not considered as matching if the value indicated by the data rate information D15 stored in the album information D2 is different from the value of the data rate set in the audio data as the download data. In other words, that CD-TOC is processed as not yet registered as the album information D2.

If the determination result in step S603 is that the TOC data received as the download data is not yet registered as the album information D2, the algorithm proceeds to step S604.

In step S604, new album information D2 is produced using the CD-TOC information of the download data received and acquired in the previous step 602, and is stored in the ripping database 20B. In step S605, the newly produced album information D2 is set as album information D2 of a download destination (for ripping). The algorithm then proceeds to step S607.

If the determination result in step S603 is that the TOC data received as the download data is registered as the album information D2, the algorithm proceeds to step S606.

In a process step in step S606, the album information D2 registered and already stored in the ripping database 20B is set as album information D2 of a download destination (for ripping). The algorithm proceeds to step S607.

In step S607, the audio data, received and acquired as the download data in the process step in the previous step S602, is recorded onto the hard disk 20 as the ripped file 20A. In this case, since the audio data as the download data is audio data already compressed using the same method as the one used in the ripped file 20A, the compression process of the signal processor circuit 22 is not required.

When the recording of the audio data is completed in the above step S607, the ripped file table D1 is updated based on the result of recording so that the audio data recorded on the hard disk 20 as the ripped file 20A this time is registered.

Along with this step, the content of the album information D2 set as the download destination (for ripping) in the previous step S605 or S606 is updated. More specifically, the file ID of the ripped file 20A newly recorded in this downloading is stored in association with an appropriate track number of the ripping state table D13.

When the ripped file 20A as the download data is associated with the track number of the ripping state table D13, the HDD controller 25 must know the track number of the audio data as the download data in the album. To this end, attaching the information of the track number within the album to the audio data as the download data suffices.

The following arrangement is contemplated for the HDD controller 25 to recognize the track number of the audio data as the download data within the album.

Specifically, replay time of the audio data is determined from the size thereof. Replay time of each track within the album is also determined from the content of the CD-TOC acquired as the same download data. The replay time of the audio data is checked against the replay time of each track obtained from the CD-TOC. If the replay times match each other, the HDD controller 25 recognizes the track number.

Since the ripped file 20A is downloaded from the download server 100 rather than the CD in this case, the ripping system apparatus 1 is unable to acquire the text data of the track title.

In this case, the track title of the track number in text data is produced in accordance with the process of step S804→S805 in the flowchart shown in FIG. 13. The track title is associated with and stored to the track area (D32(1)-D32 (N)) of an appropriate track number of the title table D14.

The track title recorded as the text data on each CD (CD-TOC) corresponding to download audio data may be stored in the form of a database in the storage unit 101 of the download server 100, for example.

In addition to the audio data and the CD-TOC data, the download server 100 sends the text data of the track title as the download data in response to the download request. In this way, the ripping system apparatus 1 acquires the track title during downloading, thereby storing the track title in the title table D14 of the album information D2. If the download data includes the album title in addition to the track title, the album title is also stored in the title table D14.

Figure 15:
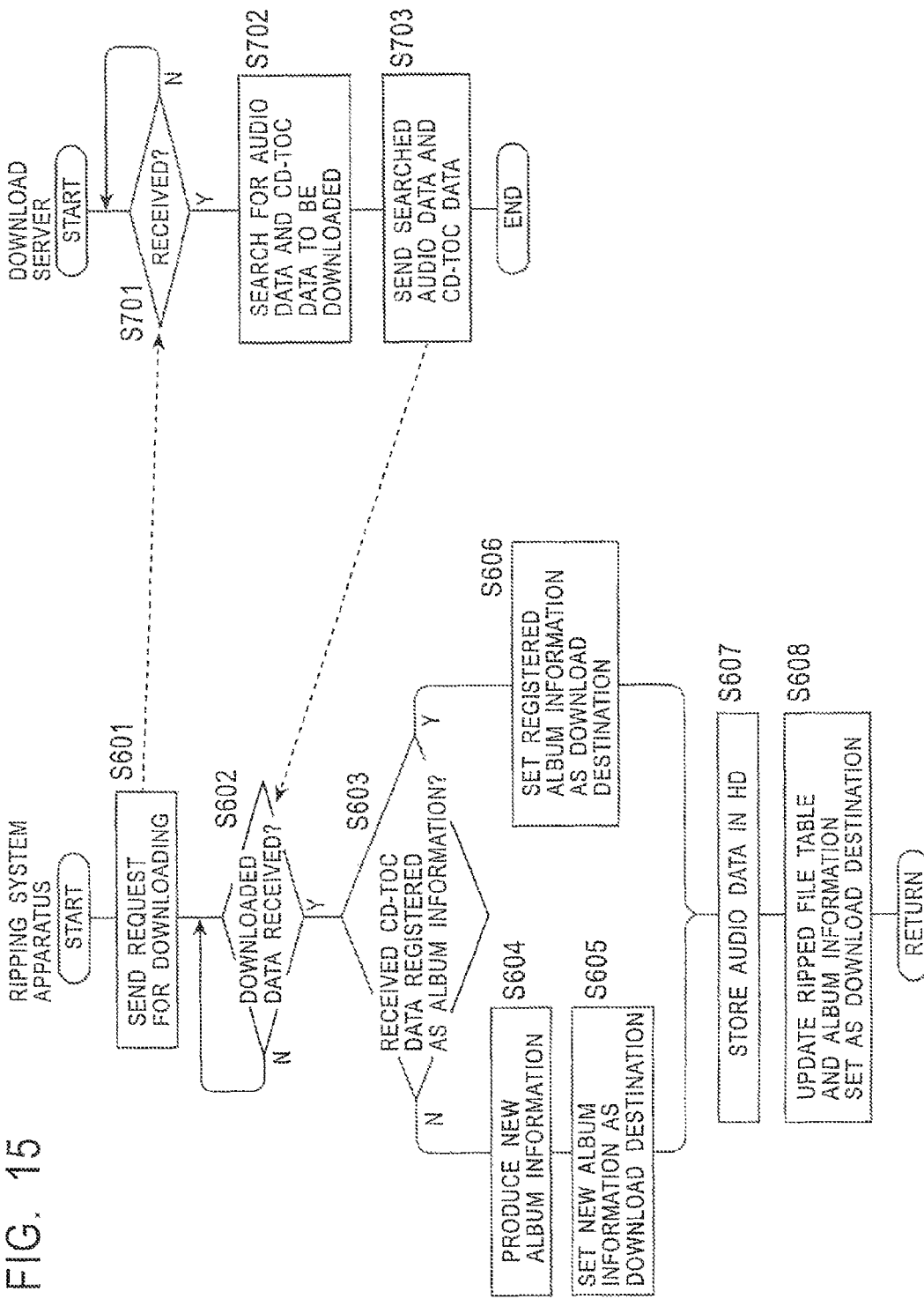
FIG. 15 is a flowchart illustrating the process of a download operation performed between the download server and the ripping system apparatus.

In the process illustrated in FIG. 15, the download server 100 always sends the CD-TOC when the download server 100 downloads the audio data in response to the download request. The ripping system apparatus 1 determines whether the received and acquired CD-TOC has already been registered as the album information. If the CD-TOC has been registered, the received and acquired CD-TOC is unused and discarded.

The following downloading method for downloading the CD-TOC may be contemplated.

When the audio data to be downloaded is selected and determined from the download list in the ripping system apparatus 1, the ripping system apparatus 1 determines whether the album information D2 corresponding to the selected and determined audio data is registered in the ripping database 20B of the hard disk 20.

To this end, an arrangement must be prepared to recognize content identity as to whether the audio data presented in the download list and the audio data recorded as the ripped file 20A on the hard disk 20 are identical to each other in content. In one arrangement, a file ID, which becomes unique with the same rule applied thereto, is attached to the audio data in the download list and the ripped file 20A.

For example, both the audio data in the download list and the ripped file 20A are originally the same audio data recorded on the CD. The file ID may be obtained by calculating a predetermined function on data such as the TOC and the track number of the CD that records that audio data. The audio data of the same track number on the same CD is tagged with the identical value of file ID on both the download server 100 and the ripping system apparatus 1.

If it is determined that the album information D2 corresponding to the audio data selected and determined from the download list has been registered in the ripping database 20B of the hard disk 20, the ripping system apparatus 1 does not need to acquire the CD-TOC from the download server 100. In such a case, the ripping system apparatus 1 and the download server 100 operate so that only the audio data as the download data is downloaded. Since the download data is the audio data only, the size of the download data becomes smaller. For example, download time is shortened, and the burden on transmitter and receiver sides for processing the download data is reduced.

If it is determined that the album information D2 corresponding to the audio data selected and determined from the download list has not been registered in the ripping database 20B of the hard disk 20, the audio data and the CD-TOC data (and the track title and the album title) are downloaded as the download data in the same manner as already discussed.

In accordance with the present embodiment, the CD-TOC is also acquired and is registered as the album information D2 when the download server 100 downloads the audio data.

When the ripping system apparatus 1 of the present embodiment performs the CD synchronized ripping thereafter, the album information D2 registered based on the CD-TOC acquired as the download data remains usable.

With the CD 10 loaded in the CD section 2 for the CD synchronized ripping, the process in step S204 and subsequent steps shown in FIG. 11 is performed to recognize the ripping state concerning the album as the loaded CD 10. To perform the process in step S204 and subsequent steps, the album information D2 registered based on the CD-TOC acquired as the download data is used without any difference from the album information D2 registered based on the TOC read and acquired from the CD 10.

In accordance with the present embodiment, programs for the processes illustrated in FIG. 11, FIG. 12, FIG. 13, and FIG. 15, to be performed by the CD controller 14 of the CD section 2, the HDD controller 25 of the HDD section 3, and the UI controller 31, are stored in the ROM 15, the ROM 23, and the ROM 32 of the respective controllers. Since the HDD controller 25 has the hard disk 20 in the present embodiment, the programs may be installed in the hard disk 20 rather than the ROM 23.

The program to be executed by the controller 105 of the download server 100 is stored in the storage unit 101 as a hard disk, for example, as the application program 104 is stored as illustrated in FIG. 14.

The above-mentioned programs may be stored (recorded) temporarily or permanently in a removable storage medium such as a flexible disk, a CD-ROM (Compact Disc Read Only Memory), an MO (Magnet Optical) disc, a DVD (Digital Versatile Disc), a magnetic disc, or a semiconductor memory. Such a removable storage medium may be provided as so-called package software.

For example, in the ripping system apparatus 1 of the present embodiment, each of the CD-ROM and DVD in the CD section 2 is replayable. The CD section 2 replays, and read programs from the CD-ROM and DVD, and stores the programs in the ROM 15, the ROM 23, the ROM 32, and the hard disk 20 for installation.

A data interface such as a USB (Universal Serial Bus) or IEEE1394 may be mounted in the ripping system apparatus 1 of FIG. 1. The programs replayed from a medium by a medium driver connected to such a data interface are installed in the ripping system apparatus 1 in the same manner described above.

Programs executing processes in compliance with the processes illustrated in FIG. 11, FIG. 12, FIG. 13, and FIG. 15 may be included in a program offering ripping function, and the program may be stored in each of a variety of storage media. The operation of the present embodiment may be performed after installing the program in a general-purpose personal computer.

The program may be installed from the above-referenced removable storage medium. Furthermore, the program may be downloaded, through a network such as an LAN (Local Area Network), or the Internet, from a server that stores the program.

The present invention is not limited to the aforementioned arrangements.

For example, the aforementioned discussion of the ripping system apparatus 1 of the present embodiment is assumed to be a single apparatus. However, the ripping system apparatus 1 may be arranged in a system where the ripping system apparatus 1 is separated into at least two units, one unit having the function of the CD section 2 and the other unit having the function of the HDD section 3, with the two units interconnected to each other through a predetermined data interface. In this case, the function of the user interface section 4 shown in FIG. 1 may be provided in each of the unit functioning as the CD section 2 and the unit functioning as the HDD section 3.

In accordance with the present embodiment, the digital audio data is ripped. The present invention is not limited to the digital audio data. The type of data may be video data as long as the data to be ripped is managed by album.

The storage medium as a rip source and the storage medium as a rip destination are not limited to the CD and the hard disk, respectively. The storage media may include a variety of storage media including other disk media, and a data storage medium such as a memory element.

As described above, the present invention recognizes the data unrecorded on the second storage medium (as the ripping state) out of the data recorded on the first storage medium when the data managed by the first management data (TOC of the CD) by program (track) is read from the first storage medium (CD), and stored onto the second storage medium (hard disk). Based on the recognition result of the unrecorded data, the present invention replays and outputs the unrecorded data only, and stores the unrecorded data onto the second storage medium.

For example, data recording may performed from the first storage medium to the second storage medium to achieve the record result that fully accounts for the content recorded on the first storage medium in the record content in the second storage medium. In other words, all data on the first storage medium is ripped to the second storage medium.

In such a case, if a portion of the data belonging to the album is already recorded on the second storage medium, the arrangement of the present invention prevents already recorded portion of data from being replayed from the first storage medium. As a result of ripping, no data is duplicated on the second storage medium, and the capacity of the second storage medium is effectively used.

In accordance with the present invention, the data already recorded on the second storage medium is not transferred from the first storage medium to the second storage medium. Time required for ripping is accordingly reduced when the data content on the first storage medium is ripped to the second storage medium in a manner such that the record content of the second storage medium fully accounts for the record content of the first storage medium.

In accordance with the present invention as described above, the operation to recognize the data unrecorded on the second storage medium (as the ripping state) out of the data recorded on the first storage medium, and the operation to replay only the unrecorded data to be ripped based on the recognition result from the first storage medium (for program replay) are automatically performed without user intervention based on the result of comparison (check) of the first management data (TOC of the CD) read from the first storage medium with the second management data (album information) produced from the first management data. In other words, the ripping operation of the present invention is automatically executed without the need for user operation, and improves the ease of use of the apparatus.

The invention claimed is:

1. A method of an information processing apparatus for recording data, the method comprising:

automatically reading first management data from a first recording medium, the first management data identifying tracks of source data recorded on the first recording medium;

automatically comparing, by a processor of the information processing apparatus, the first management data with second management data, the second management data identifying files of ripped data recorded on a second recording medium;

automatically transferring one of the tracks of the source data to the second recording medium, the one of the tracks of the source data being transferred when absent from the second recording medium and becomes one of the files of the ripped data; and automatically displaying transferring status by a symbolic figure.

2. The method according to claim 1, wherein the symbolic figure is a rectangular percentage bar.

3. The method according to claim 1, wherein the symbolic figure is a circle.

4. The method according to claim 1, further comprising:
compressing the one of the tracks of the source data, and
wherein the compressed one of the tracks of the source data is transferred onto the second recording medium in the automatically transferring step.

5. The method according to claim 1, wherein the second management data includes at least one of an album ID, album title, and track title.

6. The method according to claim 1, further comprising:
downloading a content data from an external server, and
wherein the second management data also identifies files of the downloaded data recorded on the second recording medium as the ripped data.

7. The method according to claim 1, wherein
the automatically reading and automatically comparing steps are performed when the first recording medium is loaded in, or connected to, the information processing apparatus.

8. The method according to claim 1, wherein the transferring status indicates the percentage of tracks of source data on the first recording medium stored in the second recording medium.

9. The method according to claim 1, wherein the automatically transferring step comprises:
automatically transferring a plurality of the tracks of the source data to the second recording medium when the plurality of the tracks are determined not to be stored on the second recording medium in the automatically comparing step.

10. An information processing apparatus, comprising:
circuitry configured to
automatically read first management data from a first recording medium, the first management data identifying tracks of source data recorded on the first recording medium,
automatically compare the first management data with second management data, the second management data identifying files of ripped data recorded on a second recording medium,
automatically transfer one of the tracks of the source data to the second recording medium, the one of the tracks of the source data being transferred when absent from the second recording medium and becomes one of the files of the ripped data, and
automatically control a display to display transferring status by a symbolic figure; and the display configured to display the transferring status by the symbolic figure.

11. The information processing apparatus according to claim 10, wherein the symbolic figure is a rectangular percentage bar.

12. The information processing apparatus according to claim 10, wherein the symbolic figure is a circle.

13. The information processing apparatus according to claim 10, wherein the circuitry is configured to compress the one of the tracks of the source data, and
wherein the compressed one of the tracks of the source data is transferred onto the second recording medium by the circuitry.

14. The information processing apparatus according to claim 10, wherein the second management data includes at least one of an album ID, album title, and track title.

15. The information processing apparatus according to claim 10, wherein the circuitry is configured to
download a content data from an external server, and
wherein the second management data also identifies files of the downloaded data recorded on the second recording medium as the ripped data.

16. The information processing apparatus according to claim 10, wherein
the circuitry automatically reads the first management data from the first recording medium, and automatically compares the first management data with the second management data, when the first recording medium is loaded in, or connected to, the information processing apparatus.

17. The information processing apparatus according to claim 10, wherein the transferring status indicates the percentage of tracks of source data on the first recording medium stored in the second recording medium.

18. The information processing apparatus according to claim 10, wherein the circuitry is configured to automatically transfer a plurality of the tracks of the source data to the second recording medium when the plurality of the tracks are determined not to be stored on the second recording medium by the circuitry.

19. An information processing apparatus, comprising:
circuitry configured to
automatically read first management data from a first recording medium, the first management data identifying tracks of source data recorded on the first recording medium,
automatically compare the first management data with second management data, the second management data identifying files of ripped data recorded on a second recording medium,
automatically transfer one of the tracks of the source data to the second recording medium, the one of the tracks of the source data being transferred when absent from the second recording medium and becomes one of the files of the ripped data, and
automatically output transferring status by a symbolic figure.

20. The information processing apparatus according to claim 19, wherein the transferring status indicates the percentage of tracks of source data on the first recording medium stored in the second recording medium.

* * * * *